US005826680A

United States Patent [19]

Takemoto et al.

[11] Patent Number: 5,826,680

[45] Date of Patent: Oct. 27, 1998

[54] BILL HANDLING SYSTEM IN A GAMING HOUSE

[75] Inventors: Takatoshi Takemoto; Kazunari Kawashima, both of Tokyo, Japan

[73] Assignee: Kabushiki Kaisha Ace Denken, Japan

[21] Appl. No.: 343,431

[22] PCT Filed: May 19, 1993

[86] PCT No.: PCT/JP93/00653

§ 371 Date: Nov. 18, 1994

§ 102(e) Date: Nov. 18, 1994

[87] PCT Pub. No.: WO93/23828

PCT Pub. Date: Nov. 25, 1993

[30] Foreign Application Priority Data

May 19, 1992 [JP] Japan .................................... 4-126454

[51] Int. Cl.[6] ........................................................ G06F 7/04

[52] U.S. Cl. ............................ 186/37; 271/3.14; 271/181

[58] Field of Search .................................... 194/206, 207; 186/35, 36, 37, 52, 14; 271/180, 181, 298, 3.14

[56] References Cited

U.S. PATENT DOCUMENTS

| | | | |
|---|---|---|---|
| 4,342,384 | 8/1982 | Fukase et al. | 221/9 X |
| 4,697,708 | 10/1987 | Goto et al. | 186/37 X |
| 4,775,783 | 10/1988 | Sasaki et al. | 235/379 |
| 5,167,300 | 12/1992 | Yoshida et al. | 186/37 |

FOREIGN PATENT DOCUMENTS

| | | |
|---|---|---|
| 572661 | 12/1993 | European Pat. Off. . |
| 58-197574 | 11/1983 | Japan . |
| 60-17578 | 1/1985 | Japan . |
| 62-78694 | 4/1987 | Japan . |
| 1-133849 | 5/1989 | Japan . |
| 2235676 | 3/1991 | United Kingdom . |

*Primary Examiner*—F. J. Bartuska

*Attorney, Agent, or Firm*—Andrus, Sceales, Starke & Sawall

[57] ABSTRACT

A bill handling system of the invention comprises a cashbox (80) having a mechanism for automatically storing bills and a collection system (10) for gathering bills taken in game play media lending machines (12) and transporting the bills to the cashbox (80). The collection system (10) comprises stackers (30) each being placed for each of gaming machine islands **(10*a*)–(10*f*) and a transport mechanism (50) connecting the stackers (30) and the cashbox (80) for transporting the bills. The transport mechanism (50) comprises a transport chain (52) and transport cassettes (60) transported on the chain (52). Bills are stored in the transport cassette (60)** for transport.

12 Claims, 14 Drawing Sheets

| BAR CODE | DENOMINATION | NO. OF BILLS |
|---|---|---|
| | | |
| | | |
| | | |
| | | |
| | | |

BILL HANDLING SYSTEM IN A GAMING HOUSE

TECHNICAL FIELD

This invention relates to a system for automatically storing bills paid out in amusement facilities containing a large number of gaming machines, and in particular to a bill handling system for transporting bills received in gaming machine islands, in a gaming house containing the islands, where a number of gaming machines and game play media lending machines for lending game play media used with the gaming machines are placed side by side, to a sales cashbox installed in the gaming house for automatic storage.

TECHNICAL BACKGROUND

A conventional gaming house contains a number of game machine islands, each comprising a large number of gaming machines and game play media lending machines placed side by side. The gaming machine island means a group of a large number of gaming machines and game play media lending machines. The expression "islands" is derived from the fact that the machine groups are placed like islands in the gaming house.

In the gaming house, each island is provided with a stacker for temporarily storing bills paid out by players at the island. Bills received in the gaming machine island provided with the stacker are stored in the stacker. Personnel in the gaming house collect the bills stored in the stacker for each gaming machine island and carry the bills to a sales cashbox for storage.

However, such conventional art requires that personnel in the gaming house should collect bills each time the stacker installed in each gaming machine island fills with bills. Thus, if the gaming house contains a large number of gaming machine islands or sales are up, the conventional art involves a problem of a lot of time and labor required for collecting the bills.

Since a large amount of cash is taken out from the stackers and is carried around while the gaming house is open, there is the danger of bringing about crimes such as robbery.

Further, there is the danger that personnel in the gaming house who are collecting will steal the cash.

Bill collection by personnel in the gaming house makes players feel uncomfortable or players are disturbed by their movement, spoiling an atmosphere in the gaming house.

DISCLOSURE OF INVENTION

It is therefore an object of the invention to provide a bill handling system which can transport bills received in gaming machine islands to a sales cashbox for collection, rapidly and reliably without the intervention of human beings, and can prevent crimes from being brought about.

It is another object of the invention to provide a bill handling system which can eliminate the need for personnel in a gaming house to collect bills, thus creating a good atmosphere in the gaming house.

To these ends, according to one form of the invention, there is provided a bill handling system, in a gaming house containing a plurality of game play support machines each having a mechanism for taking in bills. The bill handling system comprises a cashbox having a mechanism for automatically storing bills and a collection system for gathering bills received in the machines and transporting the bills to the cashbox.

The collection system comprises one or more stackers for stacking the bills received in the support machines in order and temporarily holding the bills, and a bill transport mechanism for receiving the bills held in the stackers and transporting the bills to the cashbox.

According to another form of the invention, there is provided a bill handling system, for taking in bills sent from game play support machines, and discharging the bills to the outside of a gaming machine island. The bill handling system is installed in the gaming machine island made up of a plurality of gaming machines for players to play games and a plurality of game play support machines where players make payment required to play games on the gaming machines, each support machine having a mechanism for receiving the inserted bills for the payment. The system comprises an intra-island transport mechanism for transporting bills taken in the game play support machines one at a time and a stacker for taking in bills transported by means of the intra-island transport mechanism, and temporarily holding them, then discharging the bills to the outside.

According to a further form of the invention, there is provided, in a gaming house a bill handling system for transporting bills taken in game play support machines to a cashbox to store the bills containing a plurality of gaming machine islands each being made up of a plurality of gaming machines for players to play games and a plurality of game play support machines where players make payment required to play games with the gaming machines, each support machine having a mechanism for receiving the inserted in bills for the payment. The system comprises intra-island transport mechanisms each being placed in each gaming machine island for transporting bills taken in the game play support machines one at a time, a plurality of means, each being placed in each gaming machine island, for taking in bills transported by the corresponding intra-island transport mechanism and wadding the bills together to a predetermined size, and a bill transport mechanism for transporting the bills wadded together to the cashbox.

In their structure, the components can be made, for example, as follows:

A plurality of the gaming machines and a plurality of the game play support machines can be placed side by side for making up a plurality of gaming machine islands placed in the gaming house. The game play support machines can be devices for paying out game play media used with the gaming machines in response to an entered amount of money. For example, they can be game play media lending machines.

A plurality of the stackers can be provided. For example, one stacker is provided for each gaming machine island.

The bill transport mechanism has a transport passage connecting the stackers and the cashbox. For example, a mechanism for moving bills along the transport passage, such as a transport belt, can be placed on the transport passage. For example, the transport belt is placed so as to circulate around the stackers and the cashbox, for connection thereof.

The stackers and the cashbox have portions where bills are transferred to and from the bill transport mechanism, the portions being located near a floor on which the stackers and the cashbox are placed, and the bill transport mechanism can have the transport belt placed on the floor. The floor preferably has a double structure for concealing the bill transport mechanism.

The transport belt can have a plurality of transport cassettes, which are vessels for holding the stacked bills. For example, the transport cassettes can be attached to different points of the transfer belt.

The stacker can comprise a stacker cassette, which is a vessel for storing the stacked bills, intra-stack cassette transport means for moving the stacker cassette between a storage position at which bills are loaded into the stacker cassette and a discharge position at which bills are discharged out of the stacker, an intra-stacker bill transport mechanism for taking in bills sent from the game play support machines and transporting the bills to the storage position, a storage mechanism for storing bills transported by means of the intra-stacker bill transport mechanism in the stacker cassette with the bills stacked, at the storage position, and a first transfer mechanism for transferring the stacked bills stored in the stacker cassette to a transport cassette, at the discharge position.

The cashbox has a mechanism for receiving the bills transported by means of the bill transport mechanism and transferring the bills to the cashbox, and a mechanism for holding the transferred bills. The cashbox can have a cashbox cassette, which is a vessel for storing the stacked bills and a second transfer mechanism for transferring stacked bills from the transport cassette transported by the bill transport mechanism to the cashbox cassette.

The operation of the bill handling system of the invention is outlined as follows:

Bills received in the game play support machines are further received in the stacker. In the stacker, bills are taken in one at a time and stacked. When a bundle of the stacked bills forms a reasonable size, the bill bundle is discharged to the bill transport mechanism.

The bill transfer mechanism transfers the bill bundle to the cashbox by driving the transfer belt connecting the stackers.

The cashbox receives the transported stacked bills and stores them.

Thus, the bills taken in the game play support machines can be transported to the cashbox for collection rapidly and reliably without the intervention of human beings, therefore reducing the likelihood of crime. If the transport passage of the bill transport mechanism is placed under the floor of the gaming house, bills can be collected without disturbing the players and an atmosphere in the gaming house is not spoiled.

If the transport belt circulating in the transport direction is disposed along the transport passage in the gaming house and transport cassettes are mounted at different points of the transfer belt, the bills received in the gaming machine islands can be efficiently transported to the cashbox for collection whenever necessary, or at given time intervals.

BEST MODE FOR CARRYING OUT THE INVENTION

Referring now to the accompanying drawings, there is shown embodiments of a bill handling system of the invention.

Figure 4:
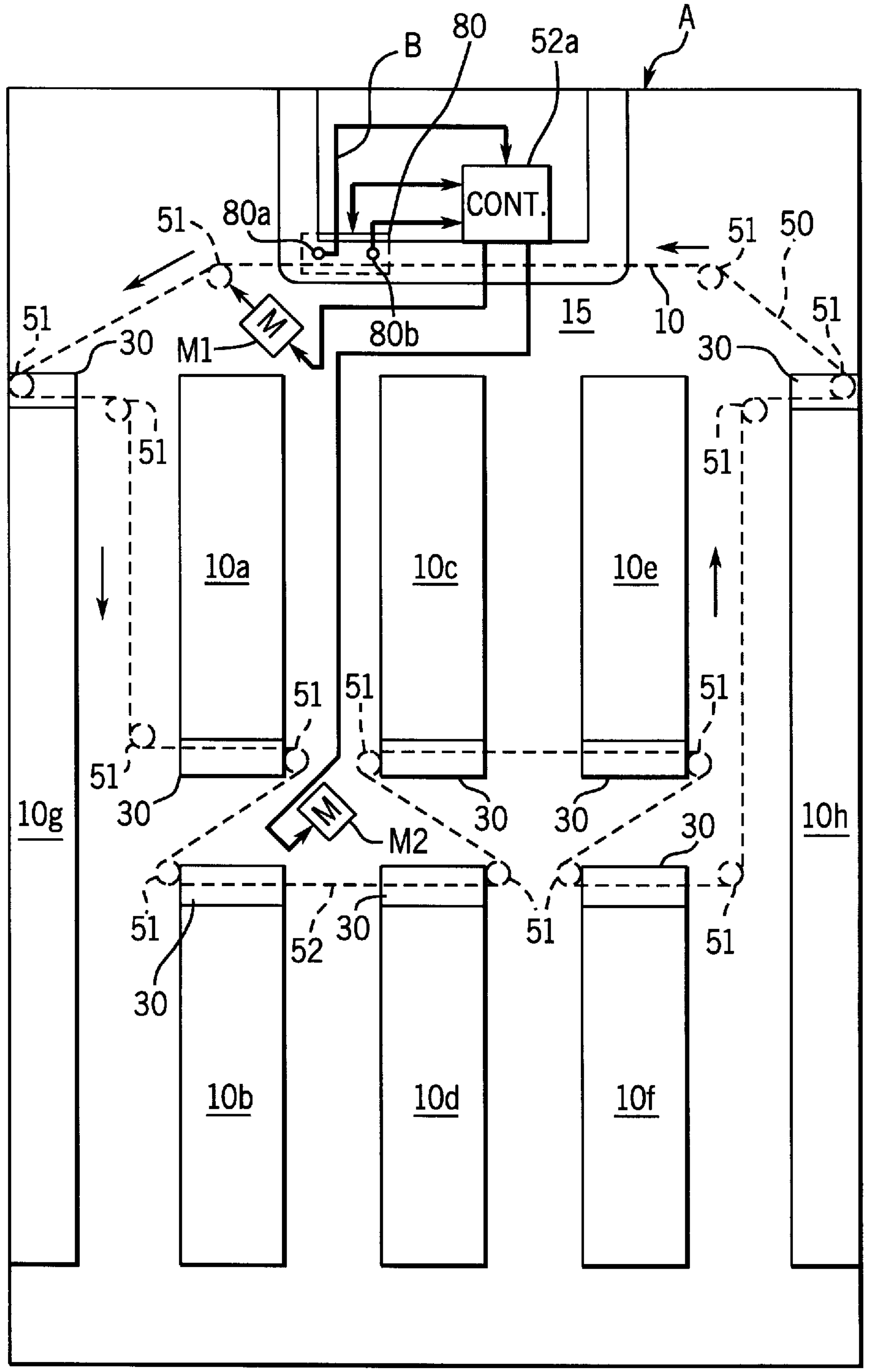
FIG. 4 is a plan view showing a gaming house equipped with stackers according to the inventions.

As shown in FIG. 4, the bill handling system according to the embodiment of the invention is situated in the gaming house A.

Figure 1:
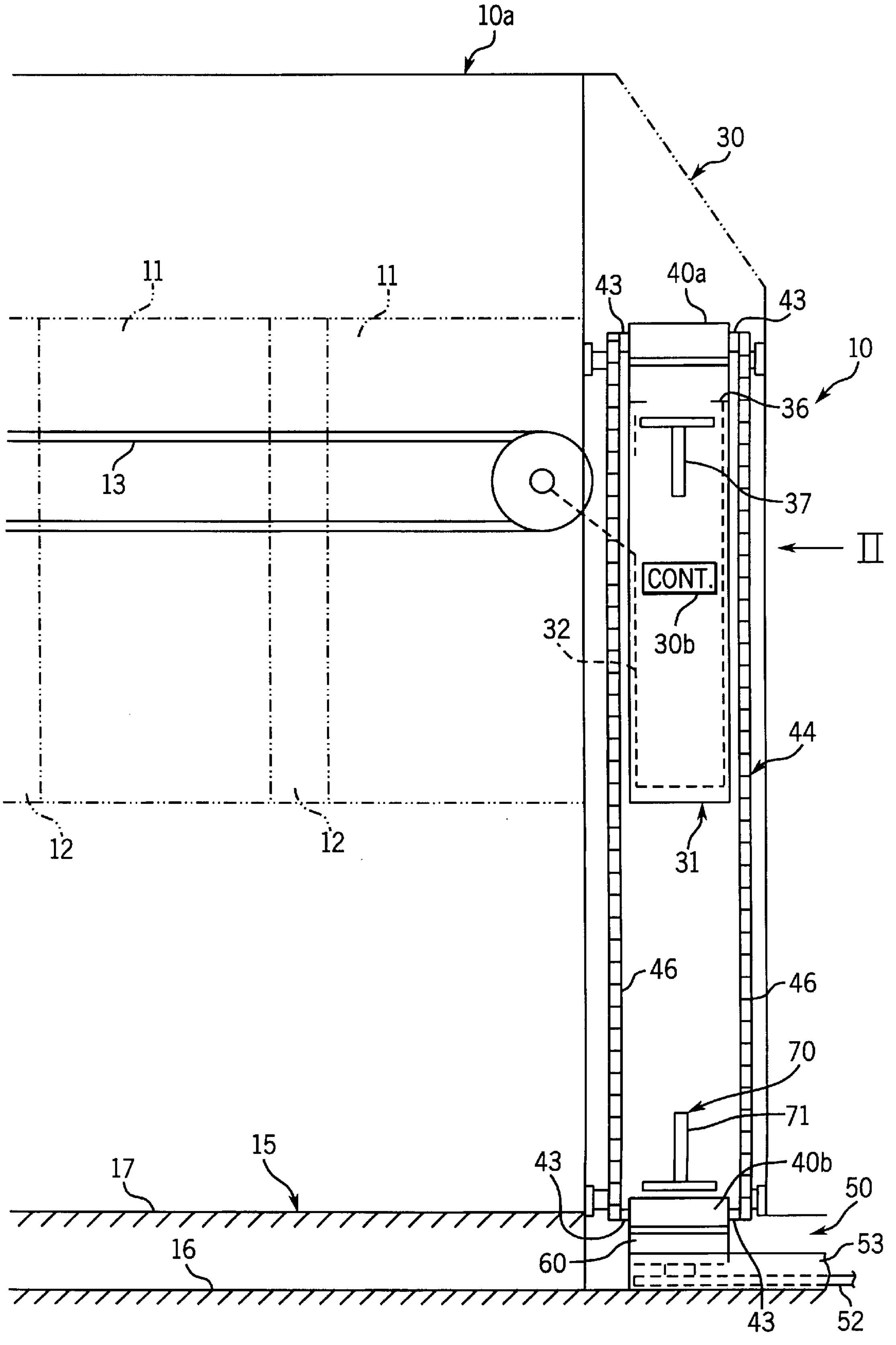
FIG. 1 is a front view showing a bill collection system according to one embodiment of the invention.
Figure 3:
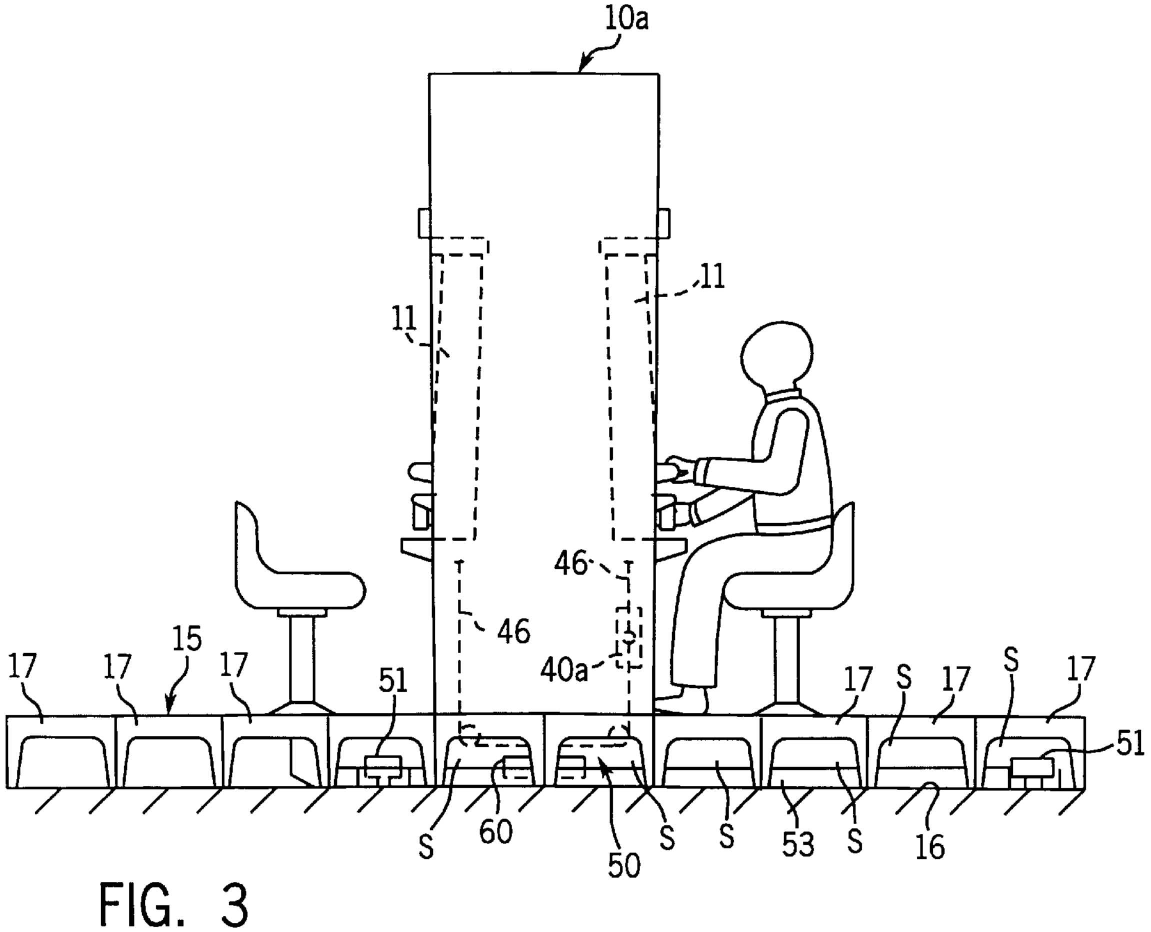
FIG. 3 is a side view showing a pinball machine island provided with a stacker according to the embodiment of the invention.

Gaming machine islands 10*a* to 10*h* are placed on a floor 15 of the gaming house A. Each of the gaming machine islands 10*a* to 10*h* has gaming machines 11 and game play media lending machines 12 placed alternately side by side in a frame-like unit as shown in FIG. 1. Each of the gaming machine islands 10*a* to 10*f* consists of two rows of gaming machines 11 and game play media lending machines 12 arranged back to back, as shown in FIG. 3. Each of the gaming machine islands 10*g* and 10*h* comprises gaming machines 11 and game play media lending machines 12 placed alternately side by side along the walls of the gaming house A.

The gaming machines 11 include, for example, those using balls as game play media, such as pinball machines, and those using medals, coins, etc., as game play media, such as slot machines. Of course, the invention is not limited to these types of gaming machines; various types of gaming machines can be provided.

The game play media lending machines 12 are machines for discharging game play media such as balls, like pinballs, or medals in response to an inserted amount and lending them to players.

The bill handling system of the embodiment comprises a cashbox 80 having a mechanism for automatically storing bills and a collection system 10 for collecting bills received in the game play media lending machines 12 and transporting the bills to the cashbox 80. In the system, the game play media lending machines 12 are installed as game play support devices having a mechanism for taking in bills, but the embodiment is not limited to them. For example, the gaming machine 11 may be provided with a bill taking-in mechanism and the game play media lending machine 12 is dispensed with. In this case, the gaming machine 11 itself also functions as a game play support device. For gaming machines using coins for playing games, a changing machine for changing bills into coins is used as a game play support device.

The collection system 10 consists of stackers 30 each placed for each of the gaming machine islands 10*a* to 10*f* and a transport mechanism 50 for connecting the stackers 30 and the cashbox 80 and transporting bills.

The game play media lending machine 12 sandwiched between two gaming machines 11 as shown in FIG. 1 pays out game play media equivalent to the amount of an inserted bill to a player, when the player inserts the bill into the game play media lending machine. It contains a bill validation section (not shown) at the portion in which a bill is entered. The bill validation section determines the denomination of the inserted bill with a magnetic sensor or optical sensor and outputs a bill denomination signal. It also determines the validity of the bill.

The gaming machine island 10*a* contains a round belt 13 for transporting bills in the island, extending in both end directions of the island along the rear of the game play media lending machines 12. The round belt 13 is disposed so as to transport bills from the game play media lending machines 12 to the stacker 30 placed on one end of the gaming machine island 10*a*.

Figure 2:
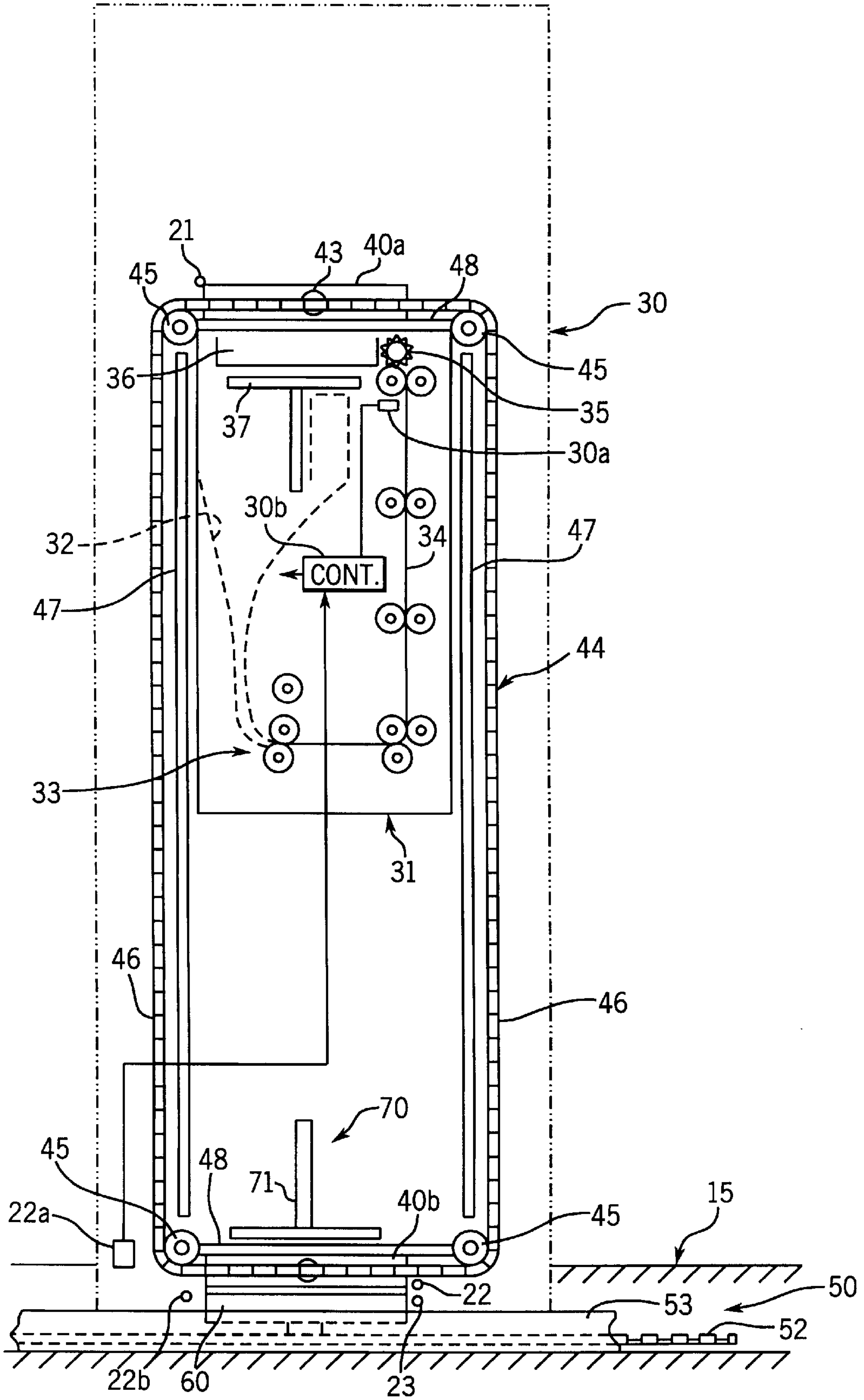
FIG. 2 is a view in the direction of arrow II in FIG. 1.
Figure 17:
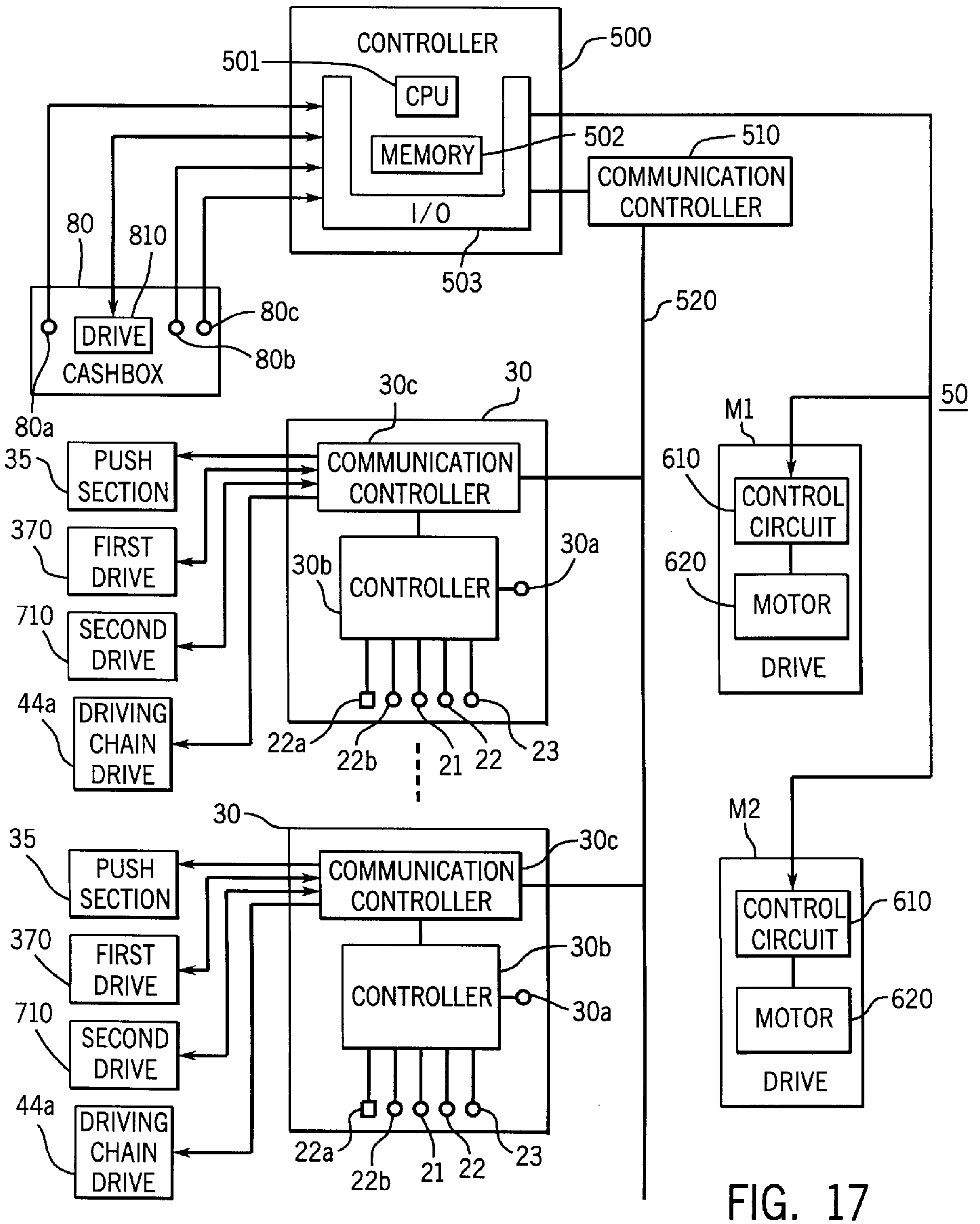
FIG. 17 is a block diagram showing an outline of the configuration of a control system in the bill handling system of the invention.

As shown in FIGS. 1, 2, and 17, the stacker 30 comprises a power stacker section 31, stacker cassettes 40*a* and 40*b* for storing wadded bills, intra-stacker transport means 44 for moving the stacker cassettes 40*a* and 40*b* being respectively provided at a storage position, where bills are loaded into the cassettes, and a discharge position, when bills wadded together are discharged to the outside, a controller 30*b* for mainly controlling the operation of the stacker 30, and a communication controller 30*c* for communicating with a controller 500.

As shown in FIG. 2, the power stacker section 31 has an acceptance section 32 in which bills transported on the round belt are entered, a separation section 33 for separating bills into individual bills, and a transport section 34 for feeding the bills into a storage section 36. The transport section 34 has a transport passage through which bills are passed one at a time so as to arrive at one end of the storage section 36. A push section 35 for stacking up bills on the storage section 36 is located at the end of the transport passage in the transport section 34. The push section 35, the storage section 36, and a stacker piston member 37 make up a bill storage mechanism.

The power stacker section 31 is also provided with a detector 30*a*, which senses whether or not a bill arrives at the end of the transport section 34. The detector 30*a* consists of an optical sensor, for example.

The controller 30*b* performs control in the stacker 30 containing the push section 35, the stacker piston member 37 (described below), the intra-stacker transport means 44, and a first transfer mechanism 70. For example, the controller 30*b* controls driving of the push section 35 in response to a detection signal of the detector 30*a*. Also, the controller 30*b*, for counting the number of bills stored in the storage section 36, has a counter (not shown) for counting detection signals of the detector 30*a*, and when the count of the counter reaches a target value, controls so as to drive the intra-stacker transport means 44. Further, the controller 30*b* is responsive to detection signals of a first proximity detector 21 and a second proximity detector 22 described below for controlling so as to drive the stacker piston member 37 and the first transfer mechanism 70 corresponding to the detectors 21 and 22 respectively.

The communication controller 30*c* is connected between the controller 30*b* and a communication line 520, as shown in FIG. 17, for communicating with the controller 500 via the communication line 520. It may be adapted to communicate with another communication controller 30*c*.

The intra-stacker transport means 44 consists of a pair of driving chains 46 and 46, two sets of sprockets 45, and 45 on which the driving chains 46 and 46 are placed substantially in the shape of a rectangle, and a driving chain drive 44*a* (see FIG. 17) for driving at least one sprocket 45 for rotation. Each set of sprockets consists of four individual sprockets 45. Two sprockets 45, 45 in each sprocket set are disposed on the lower end of the stacker 30 and the other two are disposed on the upper end of the power stacker 31; the four sprockets are positioned in the four corners of the rectangle as a whole.

The pair of driving chains 46 and 46 is placed in such a positional relationship that the stacker cassette 40*a*, 40*b* is sandwiched therebetween. Pin sections 43 and 43 project from both ends of the stacker cassette 40*a*, 40*b*. The pin sections 43 and 43 are fitted into the pair of driving chains 46 and 46. The stacker cassettes 40*a* and 40*b* are located so as to circulate in a vertical direction in the stacker 30 and move to the storage position, which is the top end, and the discharge position, which is the bottom end, with the rotation of the driving chains 46, 46. That is, the stacker cassettes 40*a* and 40*b* move in the order of upper horizontal and vertical positions and lower horizontal and vertical positions as the driving chains 46 and 46 move.

In the embodiment, the stacker cassettes 40*a* and 40*b* are inverted at the upper horizontal and lower horizontal positions. However, the stacker cassettes 40*a* and 40*b* can also be rotatably secured to the driving chains 46 and 46 for circulating in the stacker 30 so that they are not inverted.

As shown in FIG. 2, the stacker 30 contains guide members 47 and 48 for driving and smoothly circulating the stacker cassettes 40*a* and 40*b* along the driving chains 46.

The stacker cassettes 40*a* and 40*b* are cassettes for storing and transporting bills of the same size, for example, thousand-yen bills. They are mounted on the pair of driving chains 46 and 46 so that when one is at the storage position for storing bills, the other is at the discharge position for discharging bills.

Figure 5:
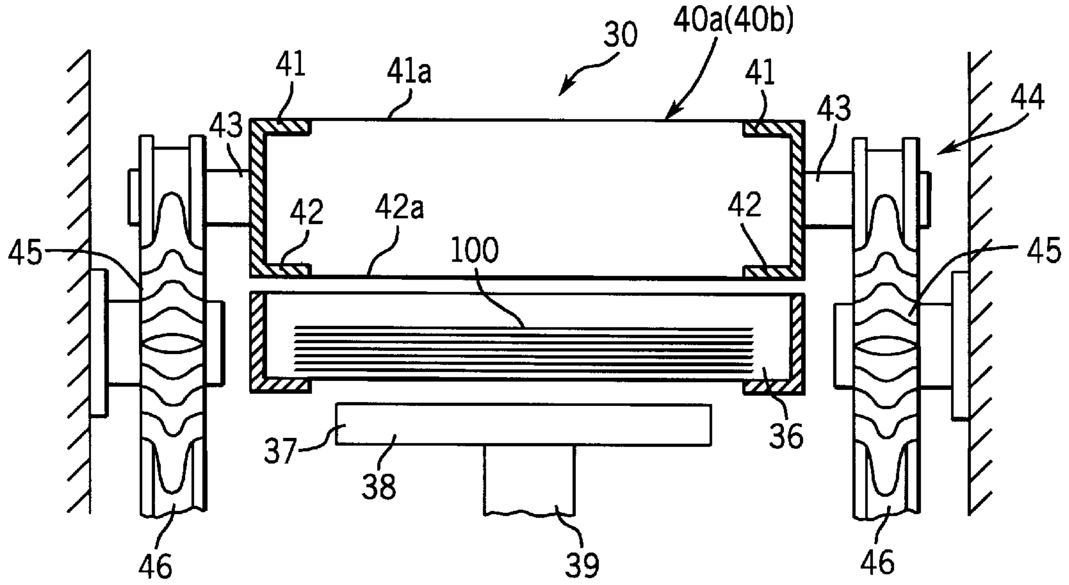
FIG. 5 illustrates the function of loading bills into a stacker cassette in the stacker according to the embodiment of the invention.

As shown in FIG. 5, the stacker cassette 40*a*, 40*b* has a bill entrance and a bill exit 41*a* and 42*a*, widely opened on the top and bottom faces (when the cassette exists on the side of the power stacker 31). Shutter member pairs 41 and 42 that can be opened and closed for holding bills with the bills stacked are provided on both end margins of the entrance and exit 41*a*, 42*a*. The shutter members 41 and 42 are normally energized by springs, etc., so that they are closed.

In fact, stacker cassettes (not shown) for storing and transporting bills of different denominations, such as five-thousand-yen bills and ten-thousand-yen bills, are mounted on the driving chains 46 and 46. Like the cassettes for thousand-yen bills described above, they are paired according to the denominations, and are mounted on the driving chains 46 and 46 in such a positional relationship that when one cassette of the pair is at the top end, the other is at the bottom end. Accordingly, the stacker 30 contains storage sections 36 and push sections 35 corresponding to the denominations of the bills.

The storage and transport mechanism for thousand-yen bills will be described below by taking it as an example:

As shown in FIGS. 5 to 8, the stacker piston member 37 is disposed on the bottom of the storage section 36 of the stacker 30. When a given number of bills, for example, 50 bills are saved in the storage section 36, the stacker piston member 37 is adapted to push and open the shutter member pair 42 of the entrance and exit 42*a* for transferring the bill bundle to the stacker cassette 40*a* (or 40*b*), moving to the storage position under the control of the controller 30*b*. The stacker piston member 37 comprises a drive rod 39 reciprocating in a vertical direction and a push plate 38. In addition, a first drive 370 (see FIG. 17) for reciprocating the drive rod 39 is installed.

As shown in FIG. 2, the first proximity detector 21 is installed on the upper end of the power stacker section 31. A cassette intrusion detector 22*b*, the second proximity detector 22, and a third proximity detector 23 are installed on the lower end of the stacker 30. Each of the proximity detectors 21, 22, 22*b*, and 23 consists of a sensor such as an optical sensor or a limit switch. The proximity detector 21 detects the stacker cassette 40*a* (or 40*b*) arriving at the storage position. The proximity detector 22 detects the stacker cassette 40*b* (or 40*a*) arriving at the discharge position. The cassette intrusion detector 22*b* detects a transport cassette 60 arriving at a position immediately preceding the discharge position of the stacker 30. The third proximity detector 23 detects the transport cassette 60 being transported to a position under the stacker cassette 40*a* (or 40*b*) at the discharge position.

An empty cassette detector 22*a* is placed at a position facing the transport cassette 60 when the transport cassette 60 is at the position immediately preceding the discharge position of the stacker 30. The empty cassette detector 22*a* senses whether or not bills are already loaded into the transport cassette 60, namely, whether or not the transport cassette 60 is empty. The empty cassette detector 22*a* consists of a reflection type photoelectric detector, for example; it detects the presence or absence of bills by using the fact that light reflected from the transport cassette 60 changes depending on whether or not bills exist.

Output signals of the detectors 21, 22, 22*b*, 23, and 22*a* are sent to the controller 30*b*. Some signals are sent via the communication line 520 (see FIG. 17) to the controller 500.

As shown in FIG. 4, the bill transport mechanism 50 is disposed below the floor 15 of the gaming house A for collecting bills stored in the stackers 30, 30 . . . of the gaming machine islands 10*a* to 10*h* and transporting the bills to the cashbox 80 installed in a counter B.

As shown in FIG. 3, the floor 15 of the gaming house A has a double-floor structure. That is, the floor 15 consists of an under-floor ground 16 and floor block members 17 with which the under-floor ground 16 is covered. The bill transport mechanism 50 is contained in spaces S formed between the floor block members 17 and the under-floor ground 16.

The bill transport mechanism 50 has an endless transport chain 52, as shown in FIG. 4. The transport chain 52 is placed along a transport passage in the gaming house passing through the stackers 30 and the cashbox 80 and circulating in the gaming house A. That is, a plurality of sprockets 51, 51 . . . are placed along the transport passage and the transport chain 52 is placed on the sprockets 51.

The transport chain 52 is driven by drives M1 and M2, each of which consists of a control circuit 610 and a motor 620 such as a synchronous motor driven under the control of the control circuit 610. The motors 620 are linked with the sprockets 51, and are operated in synchronization with each other under the control of the controller 500. The drives M1 and M2 are placed in spaces S formed between the floor block members 17 and the under-floor ground 16.

In the case that the drive M1, M2 is too large to place in space S, the drives M1 and M2 may be placed at other positions and power may be transferred to the target sprockets via a belt, rotation shaft, etc. A gear mechanism, pulley mechanism, etc., may also be installed for driving the sprockets 51 by the drives M1 and M2. Further, two motors are used in the embodiment, but the number of motors is not limited to two; one, three or more motors may be used.

Figure 9:
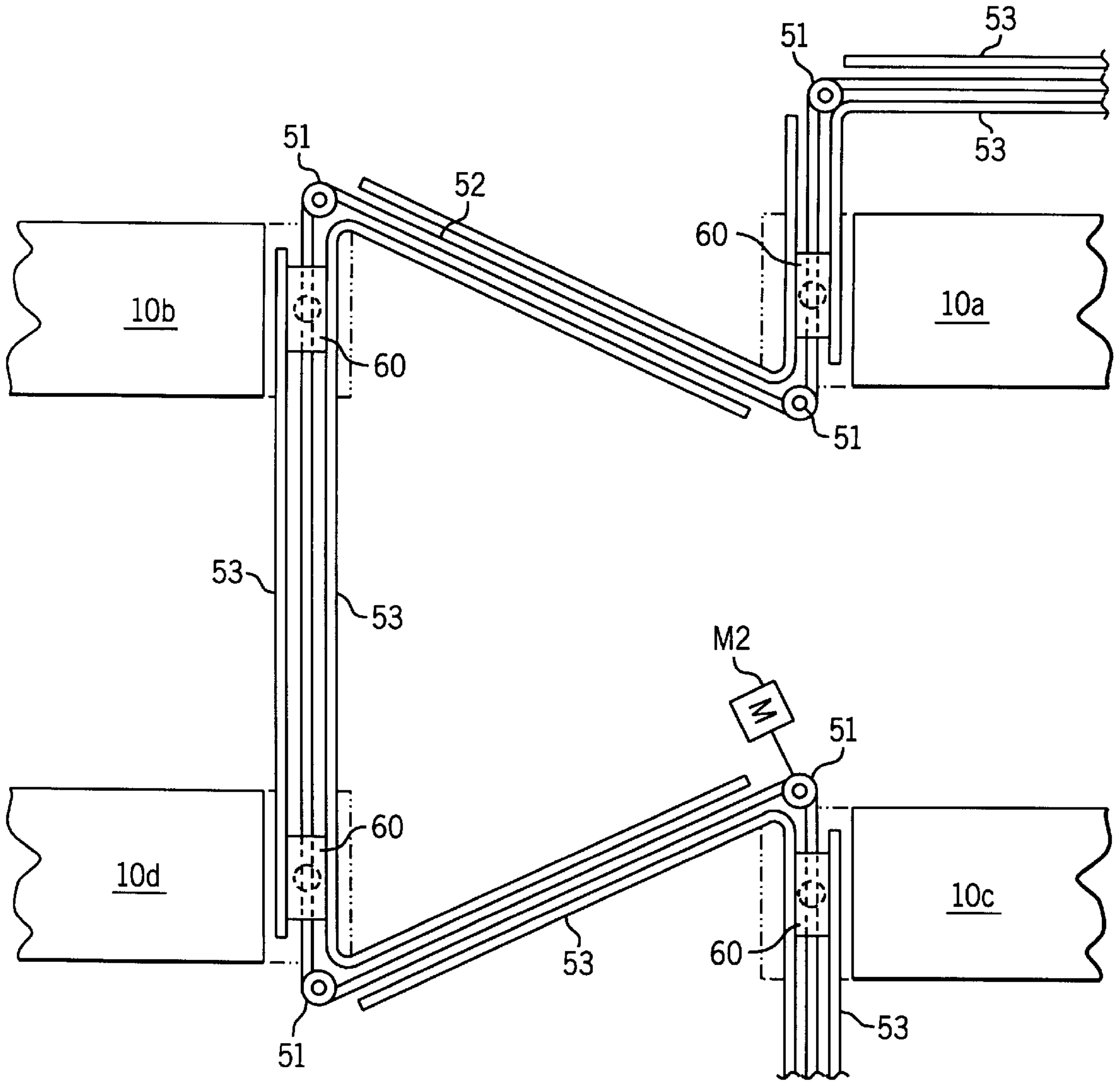
FIG. 9 is a plan view showing a bill transport mechanism according to the embodiment of the invention.

As shown in FIG. 9, a plurality of transport cassettes 60, are mounted on the transport chain 52 at almost equal intervals for collecting and carrying bill bundles discharged from the stackers 30. Guide members 53 extending along the transport chain 52 and smoothly moving the transport cassettes 60 are disposed on both sides of the transport chain 52.

As shown in FIGS. 10–13, a pin section 61 projects from the bottom of the transport cassette 60. It is supported on the transport chain 52 for rotation with respect to the chain 52. The transport cassette 60 passes under the stackers 30 for collecting a bill bundle from the stacker cassette 40*a*, 40*b* at the discharge position and carrying it to the cashbox 80. The transport cassette 60 has a bill entrance and exit 60*a* widely opened on the top face. A pair of shutter members 62 and 62 that can be opened and closed for holding bills with the bills stacked are provided on both end margins of the entrance and exit 60*a*.

As shown in FIGS. 10–13, the first transfer mechanism 70 is installed on the lower end of the stacker 30 for transferring a bill bundle in the stacker cassette 40*a*, 40*b* to the transport cassette 60 moving under the stacker cassette 40*a*, 40*b* when the stacker cassette 40*a*, 40*b* moves to the discharge position.

The first transfer mechanism 70 has a first piston member 71, which pushes and opens the shutter member pair 41 at the entrance and exit 41*a* of the stacker cassette 40*a* (or 40*b*) and the shutter member pair 62 of the entrance and exit 60*a* of the transport cassette 60 for transferring a bill bundle from the stacker cassette 40*a* (or 40*b*) to the transport cassette 60.

The first piston member 71 comprises a drive rod 72 reciprocating in a vertical direction and a push plate 73. It also has a second drive 710 (see FIG. 17) for reciprocating the drive rod 72.

As shown in FIGS. 4 and 14 to 16, the transport chain 52 of the bill transport mechanism 50 is disposed so as to pass through the inside of the cashbox 80 installed in the counter B in the gaming house A. The cashbox 80 contains a cashbox cassette 81 for storing bill bundles. The cashbox cassette 81 stores thousand yen bills for example.

The cashbox cassette 81 has a bill entrance and exit 81*a* widely opened on the bottom face. A pair of shutter members 82 and 82 that can be opened and closed for holding bills with the bills stacked are provided on both end margins of the entrance and exit 81*a*. In fact, the cashbox 80 also contains cashbox cassettes (not shown) for storing five-thousand-yen bills and ten-thousand-yen bills.

The bill storage mechanism at the cashbox cassette will be described below by taking a mechanism for storing thousand yen bills as an example:

A second transfer mechanism 90 is installed on the lower end of the cashbox 80 for transferring a bill bundle in the transport cassette 60 to the cashbox cassette 81 when the transport cassette 60 arrives at the inside of the cashbox 80. The second transfer mechanism 90 has a pair of second piston members 91 and 91 for pushing and opening the shutter member pair 62 of the entrance and exit 60*a* of the transport cassette 60 and the shutter member pair 82 of the entrance and exit 81*a* of the cashbox cassette 81 for transferring a bill bundle from the transport cassette 60 to the cashbox cassette 81. Each second piston member 91 comprises a drive rod 92 reciprocating in a vertical direction and a push plate 93. It also has a drive 810 (see FIG. 17) for reciprocating the drive rod 92.

Figure 14:
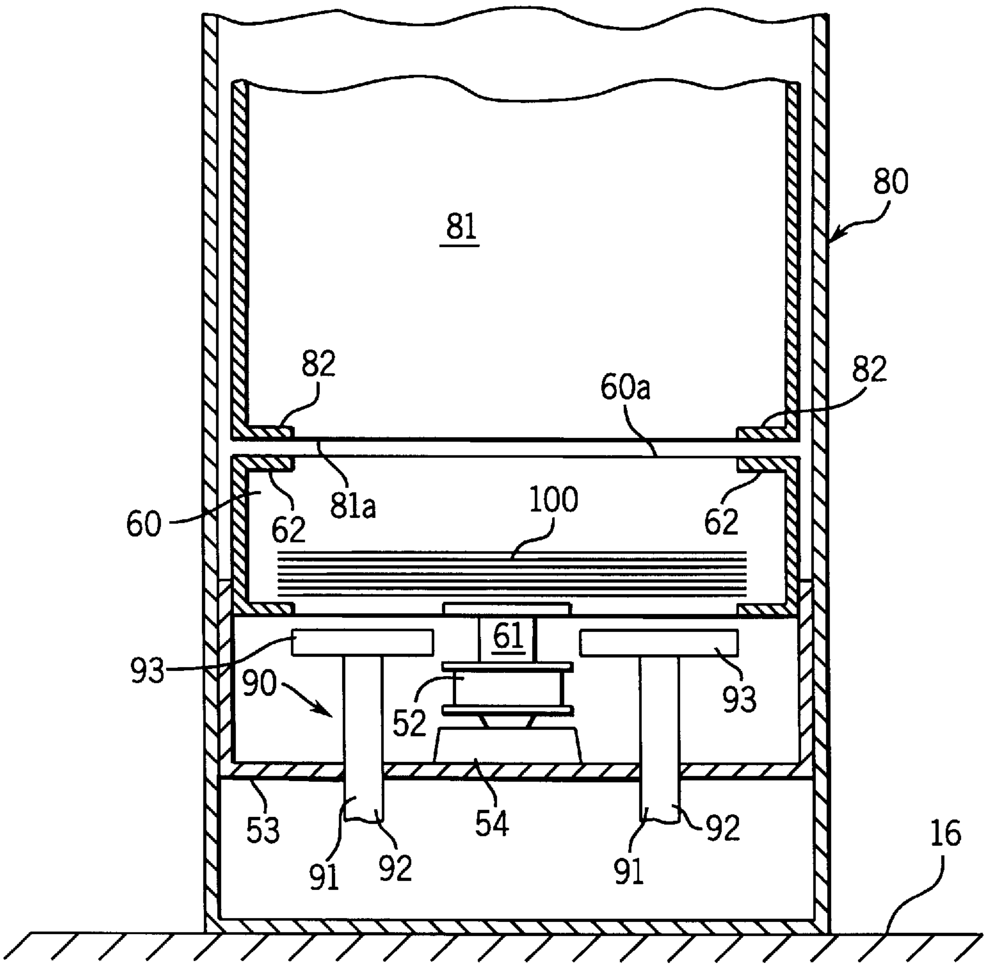
FIG. 14 illustrates the function whereby bills are transferred from a transport cassette in the bill transport mechanism to a cashbox cassette in a cashbox according to the embodiment of the invention.
Figure 15:
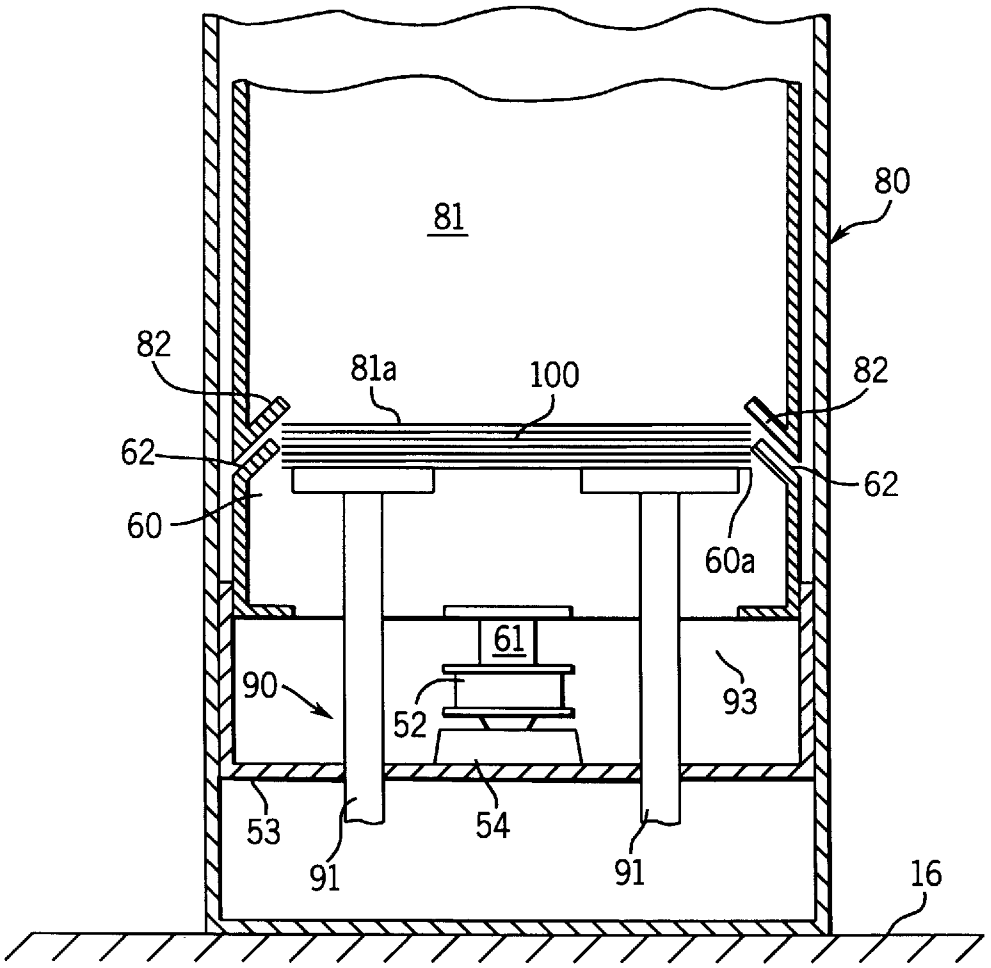
FIG. 15 illustrates the function whereby bills are transferred from a transport cassette in the bill transport mechanism to a cashbox cassette in the cashbox according to the embodiment of the invention.

As shown in FIG. 14, the guide member 53 passing through the inside of the cashbox 80 is provided with a height adjustment wedge 54 for adjusting the height position of the conveyed transport cassette 60 (See FIG. 4). A cassette intrusion detector 80*b* for detecting the transport cassette 60 approaching the cashbox 80 and a proximity detector 80*a* for detecting the transport cassette arriving at a position under the cashbox are installed on the lower end of the cashbox 80. Each of these detectors consists of a sensor such as an optical sensor or a limit switch.

An empty cassette detector 80*c* is placed at a position facing the transport cassette 60 immediately preceding the position under the cashbox 80 (See FIG. 17). The empty cassette detector 80*c* senses whether or not bills are already loaded into the transport cassette 60, namely, whether or not the transport cassette 60 is empty. The empty cassette detector 80*c* consists of a reflection type photoelectric detector, for example; it detects the presence or absence of bills by using the fact that reflected light from the transport cassette 60 changes depending on whether or not bills exist.

Detection signals of the detectors 80*a*, 80*b*, and 80*c* are sent to the controller 500, which also controls the operation of the second transfer mechanism 90.

Each of the controllers 30*b* and 500 can be composed of a computer system, such as a microcomputer system. That is, a computer system consisting of a central processing unit (CPU), a memory, an interface, etc., can be used. Control procedures of the sections are stored in the memory as a program and the CPU executes the program for controlling the sections. All or a part can be made of a hard logic circuit such as a programmable logic array.

The controllers 30*b* and 500 can be adapted to communicate with each other via the communication line. Therefore, the stackers 30, the transport mechanism 50, and the cashbox 80 can function in association with each other.

FIG. 17 shows the configuration of the control system of devices and machines used in the embodiment.

As shown in the figure, the embodiment contains the controller 500 which controls the cashbox 80 and the bill transport mechanism 50 and a plurality of controllers 30*b* each provided for each stacker 30, for controlling the stacker.

The controller 500 consists of a central processing unit (CPU) 501, a memory 502, and an interface 503, as described above. The detectors 80*a*, 80*b*, and 80*c* in the cashbox, the cashbox drive 810, and the drives M1 and M2 are connected to the interface 503. A communication controller 510 is also connected to the interface 503 for communicating with the communication controllers 30*c* of the stackers 30 via the communication line 520.

Like the controller 500, the controller 30*b* has a CPU, a memory, and an interface (not shown). The push section 35, the driving chain drive 44*a*, the first drive 370, and the second drive 710 are connected to the controller 30*b*. The detectors 30*a*, 22*a*, 22*b*, 22, 21, and 23 described above are also connected to the controller 30*b*. Further, the communication controller 30*c* is connected to the controller 30*b* as described above for communicating with the controller 500 via the communication line 520.

Next, the function of the bill handling system of the embodiment will be described.

As shown in FIG. 1, denominations of bills taken into each game play media lending machine 12 at the gaming machine island 10*a* are determined by the bill validation section in the game play media lending machine 12, and the bills are sent from the rear of the game play media lending machine 12. Subsequently, the bills are transported on the round belt 13 to the stacker 30 installed on one end of the gaming machine island 10*a* and are classified into thousand-yen bills, five-thousand-yen bills, and ten-thousand-yen bills according to the denominations of the bills, in the stacker 30 prior to storage.

Storage and transport of bills will be described below by taking storage and transport of thousand-yen bills as an example:

As shown in FIG. 2, bills entered in the acceptance section 32 of the power stacker section 31 in the stacker 30 are separated into individual bills by the separation section 33 and sent to the transport section 34. The bills are then sent through the transport section 34 to the storage section 36. That is, when one bill arrives at the termination of the transport section 34, the thousand-yen bill is loaded into the storage section 36 with the bill arranged and stacked by the push section 35 under the control of the controller 30*b*. Whether or not the bill reaches the termination of the transport section 34 is sensed by the detector 30*a*. Outputs of the detector 30*a* are counted by the controller 30*b* for detecting the number of bills stored in the storage section 36.

As shown in FIG. 5, when a predetermined number of bills (for example, 50 bills) are stored in the storage section 36, a stacker cassette 40*a* is moved to the storage position facing just above the storage section 36 by the intra-stacker transport means 44, as instructed by the controller 30*b*. When the first proximity detector 21 detects that the cassette arrives at a predetermined position, the cassette is locked to the storage position under the control of the controller 30*b*.

Figure 6:
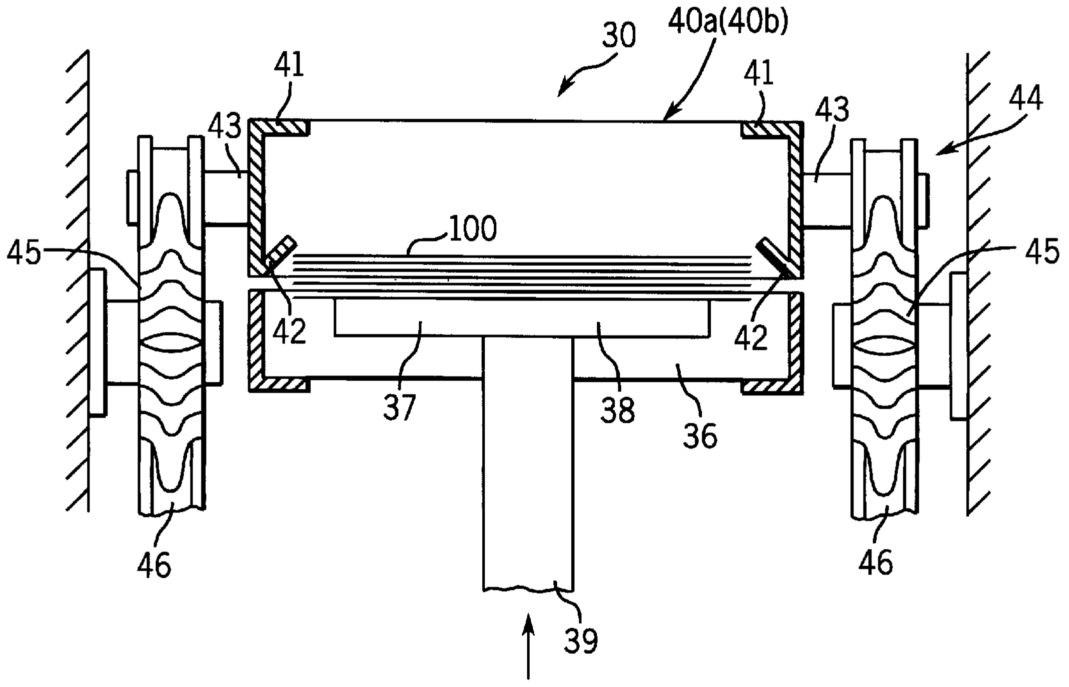
FIG. 6 illustrates the function whereby bills are loaded into a stacker cassette in the stacker according to the embodiment of the invention.
Figure 7:
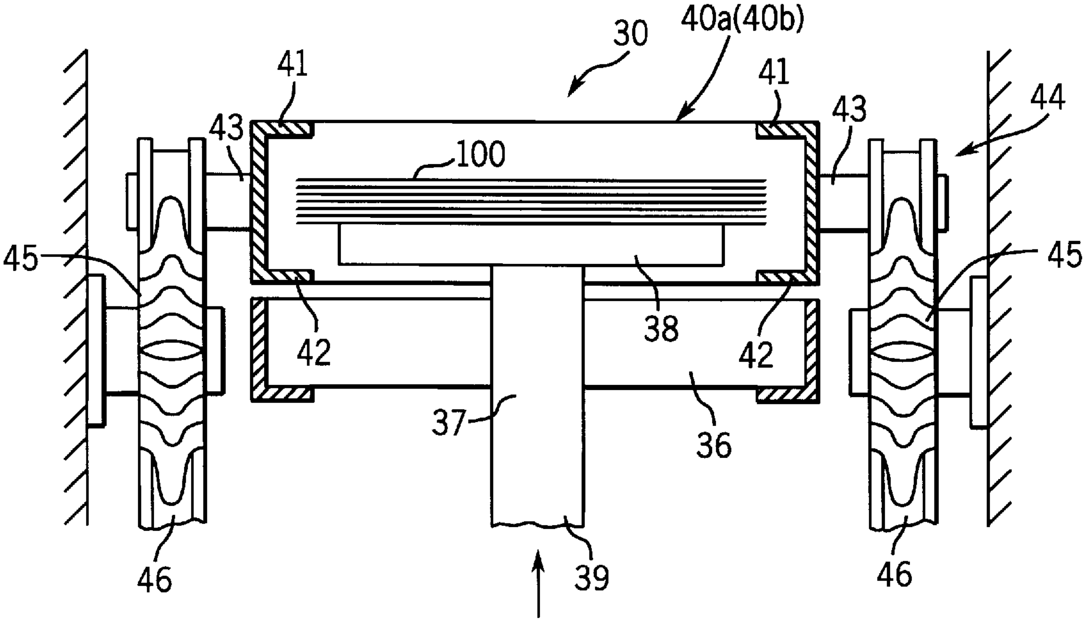
FIG. 7 illustrates the function whereby bills are loaded into a stacker cassette in the stacker according to the embodiment of the invention.
Figure 8:
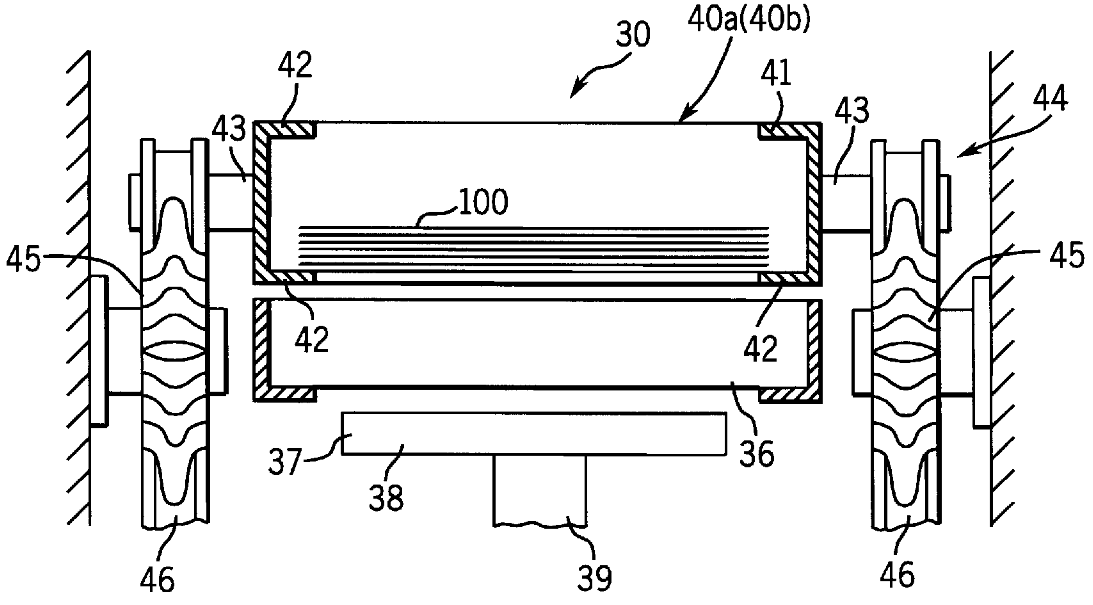
FIG. 8 illustrates the function whereby bills are loaded into a stacker cassette in the stacker according to the embodiment of the invention.

Subsequently, as shown in FIGS. 6 and 7, when receiving an instruction from the controller 30*b*, the first drive 370 (see FIG. 17) moves up the stacker piston member 37 disposed below the storage section 36 so that the push plate 38 lifts up the bill bundle and push and open the shutter members 42 and 42 of the stacker cassette 40*a* in order to transfer the bill bundle to the inside of the stacker cassette 40*a*. The bills in the stacker cassette 40*a* are caught on the shutter members 42 and 42 restored to the closed condition for storage in the stacker cassette 40*a*. The first drive 370 causes the stacker piston member 37 to fall to the former position as shown in FIG. 8. The first drive 370 informs the controller 30*b* of the condition.

When the controller 30*b* is informed of the condition in which the bills have been transferred to the stacker cassette 40*a*, it rotates the sprocket 45 of the intra-stacker transport means 44 for circulating the driving chain 46, thereby moving the stacker cassette 40*a* from the storage position to the discharge position. As shown in FIG. 2, when the stacker cassette 40*a* moves from the storage position to the discharge position, the stacker cassette 40*b* moves from the discharge position to the storage position. Therefore, bills in the storage section 36 are then stored in the stacker cassette 40*b*.

The controller 30*b* determines whether or not an empty transport cassette 60 is at the discharge position, based on signals from the empty cassette detector 22*a*, the transport cassette intrusion detector 22*b*, and the third proximity detector 23. If an empty transport cassette 60 does not exist in the stacker 30, the communication controller 30*c* requests the controller 500 to transport a transport cassette 60 to the stacker 30 via the communication line 520 and the communication controller 510.

When receiving the request, the controller 500 instructs the drives M1 and M2 to drive the transport chain 52. The control circuits 610 of the drives M1 and M2 drive their corresponding motors 620 for circulating the transport chain 52.

Figure 10:
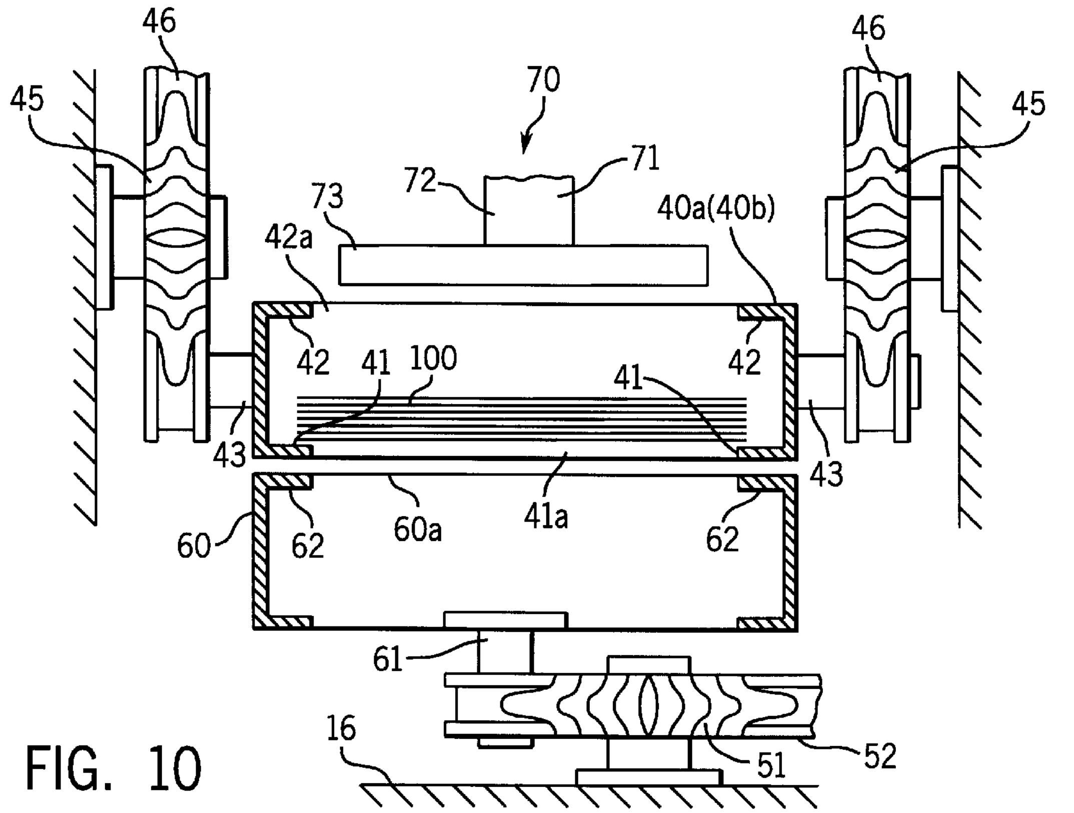
FIG. 10 illustrates the function whereby bills are transferred from a stacker cassette in the stacker to a transport cassette in the bill transport mechanism according to the embodiment of the invention.
Figure 11:
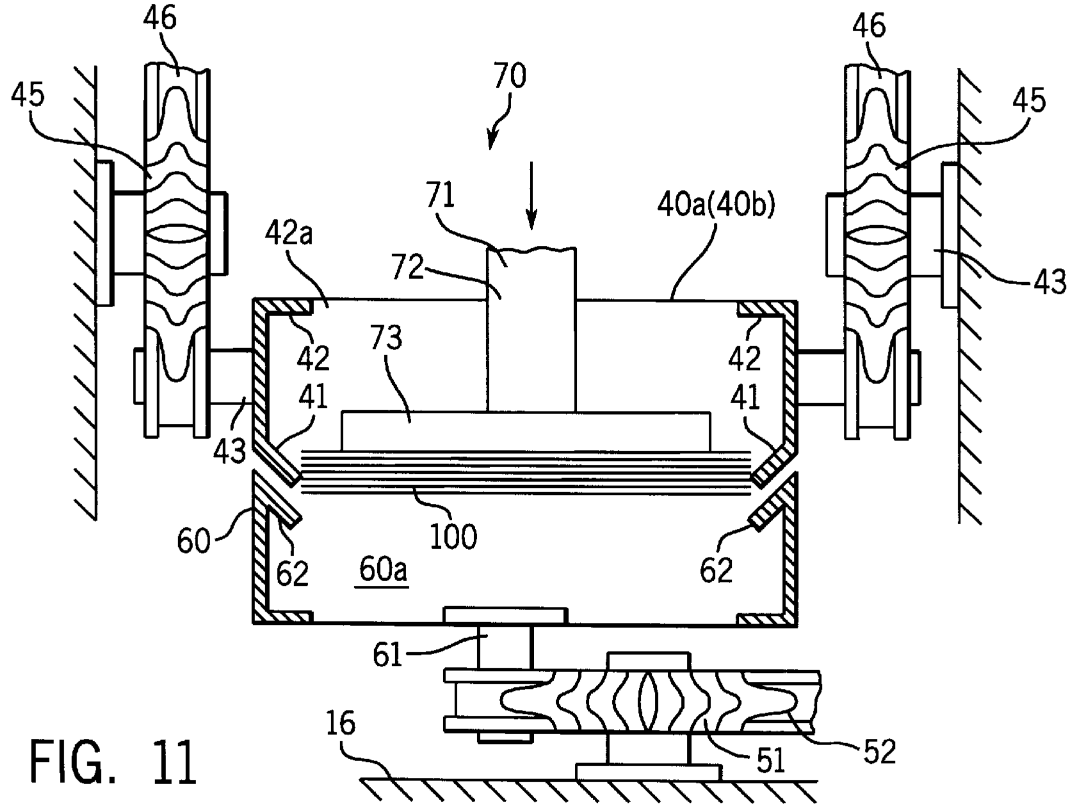
FIG. 11 illustrates the function whereby bills are transferred from a stacker cassette in the stacker to a transport cassette in the bill transport mechanism according to the embodiment of the invention.
Figure 12:
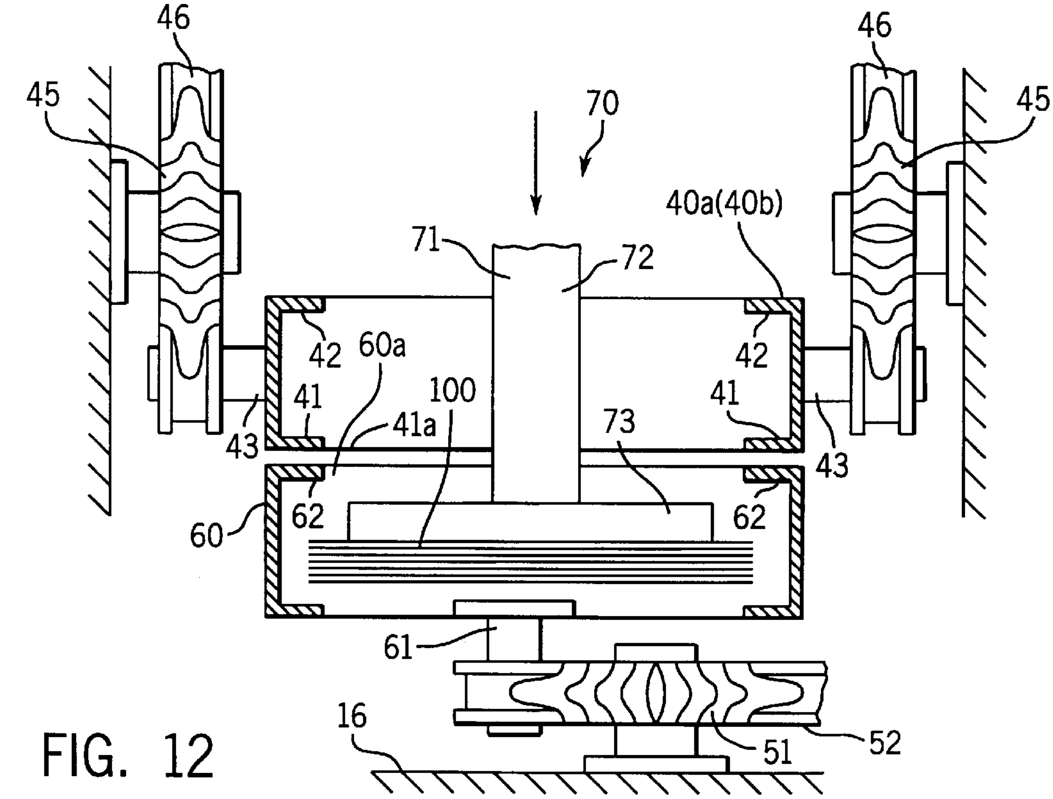
FIG. 12 illustrates the function whereby bills are transferred from a stacker cassette in the stacker to a transport cassette in the bill transport mechanism according to the embodiment of the invention.

As shown in FIG. 10, when the stacker cassette 40*a* in which bills are stored arrives at the discharge position, the second proximity detector 22 detects it and the controller 30*b* stops the transport means 44 so as to temporarily lock the cassette at the discharge position.

At this time, the transport cassette 60 on the bill transport mechanism 50 disposed under the floor 15 is sent on the transport chain 52 to a position facing under the stacker cassette 40*a* at the discharge position. When the transport cassette intrusion detector 22*b* detects it, the controller 30*b* causes the empty cassette detector 22*a* to sense whether or not bills are stored in the conveyed transport cassette 60.

When the transport cassette 60 further moves and the third proximity detector 23 detects it, a detection signal is sent to the controller 30*b*. When receiving the detection signal, the controller 30*b* checks the detection result of the empty cassette detector 22*a*. If the transport cassette 60 is not empty, the controller 30*b* ignores the detection signal from the third proximity detector 23. As a result, the transport cassette 60 continues to move without stopping at the stacker 30. That is, the stacker 30 postpones for bill transfer until another transport cassette arrives.

If the transport cassette 60 or the later conveyed transport cassette is empty, the controller 30*b* sends a signal indicating arrival of the transport cassette 60 to the controller 500 via the communication controller 30c, the communication line 520, and the communication controller 510. When receiving the signal, the controller 500 stops the transport mechanism 50 for temporarily locking the transport cassette 60 at the position.

Figure 13:
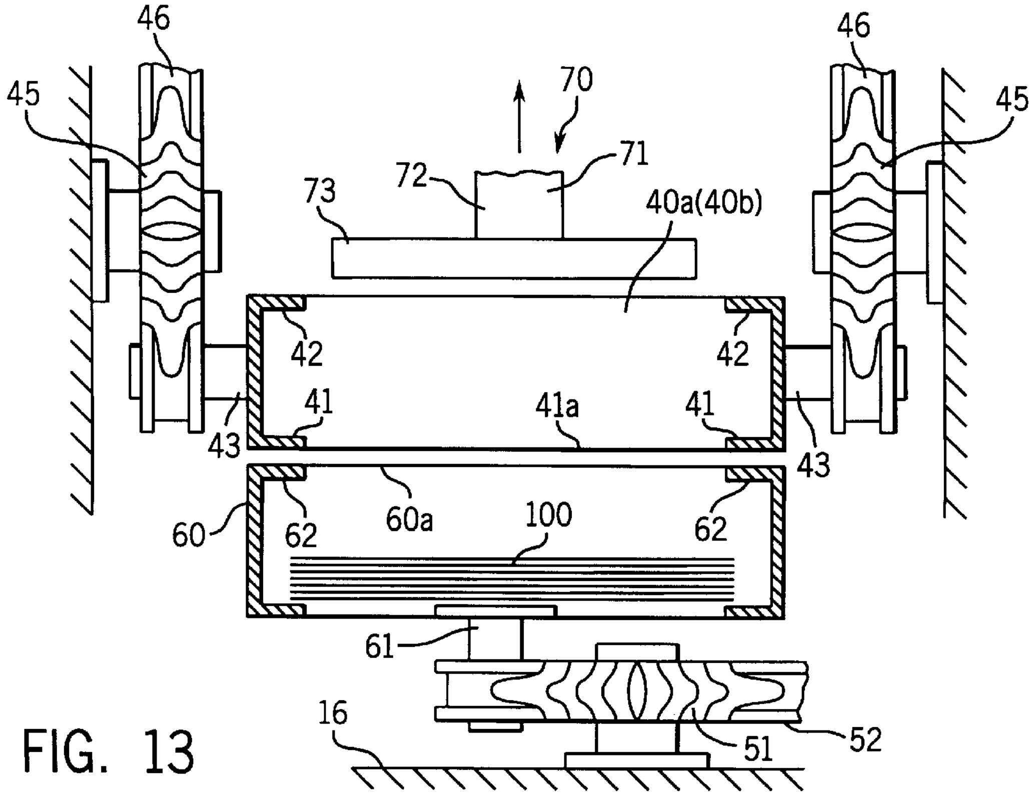
FIG. 13 illustrates a state when bills have been transferred from a stacker cassette in the stacker to a transport cassette in the bill transport mechanism according to the embodiment of the invention.

When receiving an instruction from the controller 30*b* receiving the detection signal of the third proximity detector 23, the second drive 710 (see FIG. 17) moves down the first piston member 71 of the first transfer mechanism 70 disposed above the stacker cassette 40*a* at the discharge position, whereby the push plate 73 pushes down on the bill bundle and pushes and opens the shutter members 41 and 41 of the stacker cassette 40*a* and the shutter members 62 and 62 of the transport cassette 60 for transferring the bill bundle to the inside of the transport cassette 60. When the bill bundle is completely stored in the transport cassette 60, the shutter members 41 and 41 and 62 and 62 are restored to the closed condition. The drive 710 causes the first piston member 71 to rise to the former position as shown in FIG. 13. The drive 710 informs the controller 30*b* of the condition.

The controller 30*b* sends a bill transfer end signal from the communication controller 30*c* to the controller 500 via the communication line 520 and the communication controller 510. When receiving the signal, the controller 500 instructs the drives M1 and M2 to drive the transport chain 52.

Thus, the transport cassette 60 circulates in the gaming house A for collecting bills from stacker cassettes 40*a*, 40*b* in the gaming machine islands 10*a*–10*h* and transporting the bills to the cashbox installed in the counter B, as shown in FIGS. 4 and 9.

As shown in FIG. 14, when the transport cassette 60 in which bills are stored approaches the bottom of the cashbox 80, the cassette intrusion detector 80*b* detects it and informs the controller 500. When receiving the information, the controller 500 causes the empty cassette detector 80*c* to sense whether the approaching transport cassette 60 contains bills or is empty.

Since the transport cassette 60 continues to move, it then arrives at the bottom of the cashbox 80. The proximity detector 80*a* detects it and sends a detection signal to the controller 500. When receiving the detection signal, the controller 500 checks the detection result of the empty cassette detector 80*c*. If the transport cassette 60 is an empty cassette, the controller 500 ignores the detection signal of the proximity detector 80*a*. Therefore, the transport mechanism 50 continues to transport the transport cassette 60. On the other hand, if the transport cassette 60 contains bills, the controller 500 instructs the drives M1 and M2 to stop driving the transport chain 52. Thus, when the transport cassette 60 arrives at the bottom of the cashbox 80, it stops under the cashbox cassette 81 in the cashbox 80 by the function of the guide member 53, the height adjustment wedge 54, etc.

Figure 16:
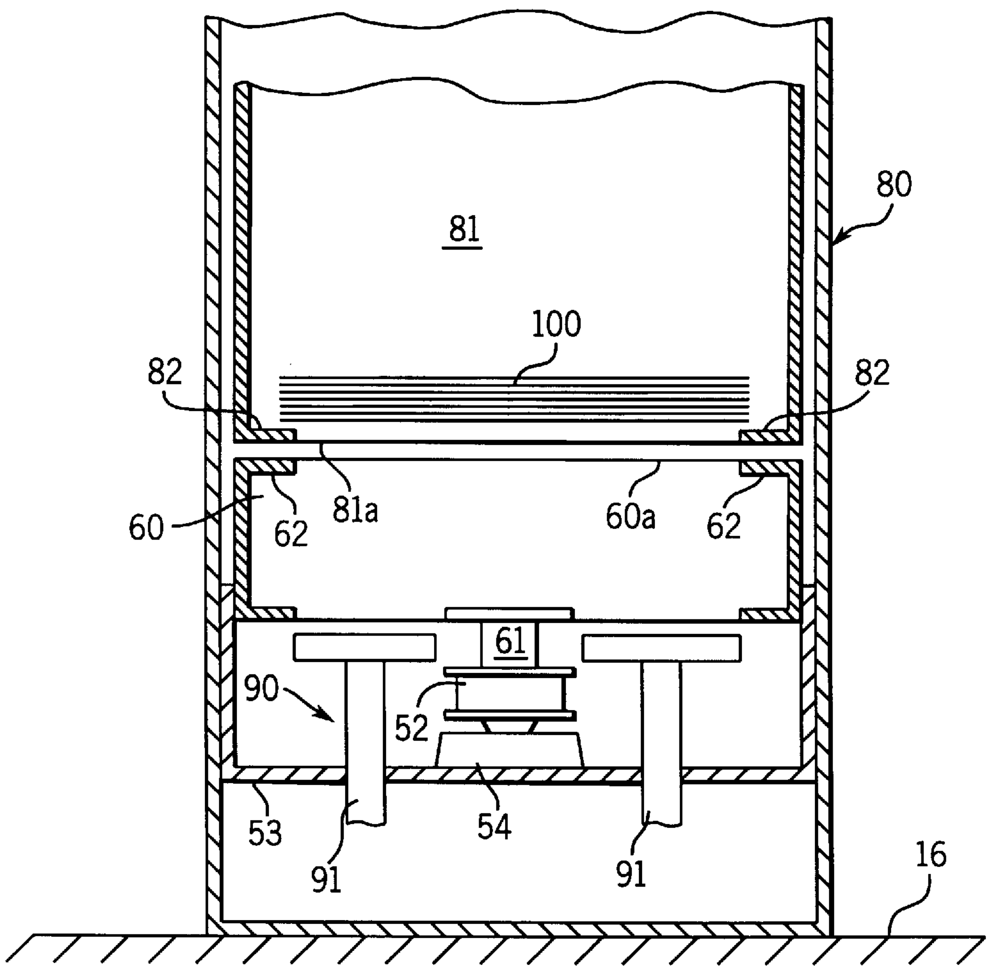
FIG. 16 illustrates the state in which bills have been transferred from a transport cassette in the bill transport mechanism to a cashbox cassette in the cashbox according to the embodiment of the invention.

Subsequently, as instructed by the controller 500, the drive 810 moves up a pair of second piston members 91 and 91 of the second transfer mechanism 90 disposed below the cashbox cassette 81, whereby the push plates 93 and 93 strongly lift up the bill bundle and push and open the lower end shutter members 82 and 82 of the cashbox cassette 81 for transferring the bill bundle to the inside of the cashbox cassette 81. The bills in the cashbox cassette 81 are caught on the shutter members 82 and 82 restored to the closed condition for storage in the cashbox cassette 81. The drive 810 causes the pair of second piston members 91 and 91 to fall to the former positions as shown in FIG. 16. The drive 810 detects the condition and informs the controller 500 of the condition.

The controller 500 stands by in this condition and waits for a request to transport a transport cassette from the controller 30*b* of any stacker 30. When receiving a transport request, the controller 500 operates as described above.

Even if a transport request is received, when bills are transferred in any of other stackers 30 and the cashbox 80, cassette transport is not started until the bill transfer is completed.

Thus, when bills are transferred from the transport cassette 60 to the inside of the cashbox 80 for collection, the transport cassette 60 will again circulate in the gaming house A on the transport chain 52 for collecting bills from the stacker cassettes 40*a* and 40*b* in the gaming machine islands 10*a*–10*h*.

We have only discussed collection of thousand-yen bills. In actual fact, five-thousand-yen and ten-thousand-yen bills are also collected in corresponding cashbox cassettes by similar mechanisms.

Bills may be collected based on the number of bills stored in a cassette or may be collected every given time.

Thus, bills taken in the gaming machine islands 10*a*–10*h* can be transported to the cash box 80 for collection rapidly and reliably whenever necessary, or at given time intervals without the intervention of human beings.

Since the bill transport mechanism 50 is disposed under the floor 15 of the gaming house A, bills can be collected without disturbing players or spoiling the atmosphere in the gaming house A.

Further, since floor blocks 17 can be taken out as desired, when problems or the like occur, only the corresponding block portion can be isolated for repair.

In the embodiment, transport cassettes 60, 60 . . . are fixed to the transport chain 52. However, the invention is not limited to it. For example, each transport cassette 60 may be detached from the transport chain 52 when bills are transferred in the stacker or the cashbox, and the cassette may be mounted on the transport chain only during transport.

In the invention, it can be developed so that transport cassettes are used as stacker cassettes. That is, a transport cassette is detached from the transport chain and mounted on the driving chain in the stacker for use as a stacker cassette. When bills are loaded into the cassette, it is detached from the driving chain and mounted on the transport chain for use as the former transport cassette.

Figures 18, 19:
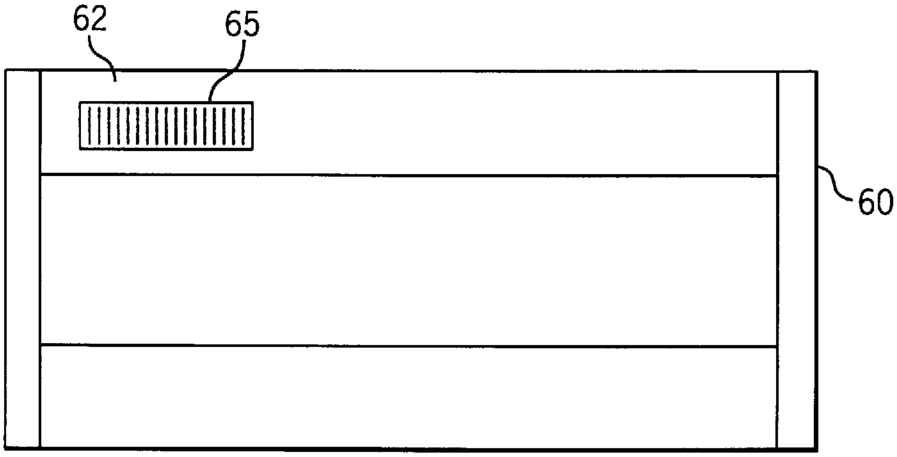
FIG. 18 is a plan view showing an example of a transport cassette used in another embodiment of the invention.
FIG. 19 is an illustration of a schematic configuration of a bar code management table used in another embodiment of the invention.

In the embodiment, any transport cassette 60 is used in each stacker 30 if it is empty. Thus, it is necessary to check whether or not the arriving transport cassette 60 is empty in the stackers 30 and the cashbox. Thus, the empty cassette detector 22*a* and 80*c* sense whether or not the arriving transport cassette is empty. However, the invention is not limited to such a system. For example, the following system can be implemented:

One or two or more transport cassettes 60 are assigned specifically to each stacker 30. Identifiers are given to all transport cassettes 60. For example, a bar code 65 is used as the identifier, as shown in FIG. 18. Bar-code readers are used in place of the empty cassette detectors 22*a* and 80*c* shown in FIG. 17. Further, the assigned bar codes are previously stored in the controllers 30*b*. The embodiment is the same as the above-described embodiment in other components. Therefore, the drawings for the above-mentioned embodiment are used here. In the description to follow, numerals 22*a* and 80*c* in FIG. 17 denote bar-code readers.

According to this embodiment, in each stacker 30, the bar code 65 of an arriving transport cassette is read through the bar-code reader 22*a* and is compared with the bar code prestored in the controller 30*b* for determining whether or not it is a cassette assigned to the stacker 30. If the cassette is assigned to the stacker 30, bills are transferred to the cassette as in the above-described embodiment. On the other hand, if the arriving transport cassette is assigned to another stacker, the cassette is allowed to pass through. The controller 30*b* informs the controller 500 of the bar code of the transport cassette 60 loaded with bills and the denomination and number of the bills via the communication line 520.

The controller 500 prepares a bar code management table in a memory 502, as shown in FIG. 19, and registers the bar code and the denomination and number of the bills received from the controller 30*b* in the table.

In the cashbox 80, the bar code 65 of the arriving transport cassette 60 is read through the bar-code reader 80*c* and is sent to the controller 500. The controller 500 compares it with the bar code registered in the memory 502 for determining whether or not the transport cassette 60 is loaded with bills. If the cassette is loaded with bills, the bills are transferred from the cassette as in the above-described embodiment. If the cassette is not loaded with bills, namely, it is empty, the transport cassette 60 is allowed to pass through.

Further, if the bills are transferred from the cassette, the controller 500 deletes the bar code from the bar code management table in the memory 502 and sends the denomination and number of the bills corresponding to the bar code to a host system not shown.

Thus, in each stacker 30, an empty cassette can be found reliably from among circulating transport cassettes 60. Since bill reception in the cashbox can be checked, bills can be transported with high reliability.

The following systems can be provided as modifications of the embodiment:

The first one is a system which executes batch management of bar codes by a controller 500. That is, transport cassettes 60 are assigned specifically to each stacker in the above-described embodiment, but are used in common in the modified embodiment. Proper identifiers, such as bar codes, are assigned to all transport cassettes, as shown in FIG. 18. A controller 30*b* of each stacker 30 informs the controller 500 of the bar code of the transport cassette into which bills are loaded in the stacker via a communication line 520. The controller 500 registers the received bar code in a bar code management table in a memory 502. In each stacker 30, the bar code of an arriving transport cassette 60 is read through a bar-code reader 22*a* and is sent to the controller 500, which then references the bar code management table to determine whether or not the received bar code is already registered in the table. If it is registered, this indicated that bills are already loaded into the transport cassette assigned the bar code. Thus, the controller 500 returns a signal indicating that the cassette is unavailable to the controller 30*b* via the communication line 520. On the other hand, if the bar code is not registered in the table, the controller 500 registers the bar code in the bar code management table and instructs drives M1 and M2 to stop a transport chain 52. It also informs the controller 30*b* that the transport cassette is available via the communication line 520.

When receiving the information, the controller 30*b* transfers bills to the transport cassette, and sends the denomination and number of bills transferred to the cassette together with the bar code of the cassette to the controller 500 via the communication line 520. The denomination and number of the bills are registered in the bar code management table in relation to the bar code.

In a cashbox 80, the cassette loaded with bills is detected and the bills are transferred to the inside of the cashbox as in the above-described embodiment.

The second is a system which executes distributed management of bar codes in each stacker. That is, whether or not a transport cassette is available in each stacker 30 is determined by the controller 500 in the first modified embodiment, but can be determined in each stacker 30. Bar codes registered in the bar code management table in the controller 500 are sent to controllers 30*b* of all stackers 30 for registration, whereby whether or not an arriving transport cassette is available can be determined in each stacker 30.

Figure 20:
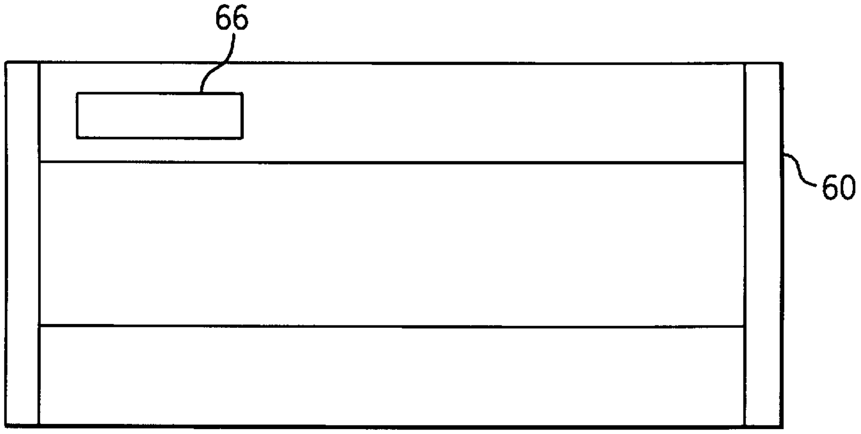
FIG. 20 is a plan view showing another example of the transport cassette used in another embodiment of the invention.

The third is a system which uses erasable or rewritable storage media, such as magnetic record media, rather than bar codes as identifiers. FIG. 20 shows a transport cassette 60 having rewritable magnetic tape placed on the top of a shutter member 62. In the modified embodiment, the transport cassette 60 is used. Magnetic readers/writers are used in place of the bar-code reader 22*a* and 80*c* used in the modified embodiment described above. In the description to follow, numerals 22*a* and 80*c* denote the magnetic readers/writers. The magnetic readers/writers 22*a* and 80*c* have read heads and write heads spaced from each other along the move direction of the transport cassette 60 so that a new signal can be written into the same position on magnetic tape after a signal is read by the reader.

In each stacker 30, the magnetic tape 66 of an arriving transport cassette is read by the magnetic reader/writer 22*a*. If a signal indicating that the cassette is unavailable is written, the cassette is allowed to pass through. If a signal indicating that the cassette is available is written, a signal indicating that the cassette is unavailable is written onto the magnetic tape 66 by the magnetic reader/writer 22*a*, then bills in the stacker are transferred to the transport cassette 60 as described above.

In a cashbox 80, the contents of magnetic tape 66 are read by the magnetic reader/writer 80*c*. If a signal indicating that the cassette is available is written, the cassette is allowed to pass through. If a signal indicating that the cassette is unavailable is written, a signal indicating that the cassette is available is written by the magnetic reader/writer 80*c*, then the bills are transferred from the transport cassette 60 to a cashbox cassette 81 as described above.

Thus, in the modified embodiment, available/unavailable information is written onto magnetic tape, so that whether or not bills are loaded into a transport cassette can be determined.

In the modified embodiment, magnetic record media are used as identifiers. Therefore, other items of information can be written in addition to the signal indicating the available/unavailable information. For example, information indicating the denomination and number of bills loaded into the cassette can be written. Further, information for specifying the stacker in which the bills are loaded into the cassette can also be written.

In the embodiments, bills are collected from the stackers installed in the gaming machine islands, but the invention is not limited to it. For example, the game play media lending machines may be provided with the stacker function to collect bills from the lending machines. Of course, the gaming machines may be provided with a similar mechanism to collect bills from the gaming machines.

The systems of the embodiments are not limited to newly built gaming houses; they can be applied relatively easily to existing gaming houses by disposing the bill transport mechanism on the floor and placing floor block members on the bill transport mechanism or improved stackers.

The cashbox and the transport mechanism are managed by a single controller in the embodiments, but may be controlled by separate controllers. The cashbox, the transport mechanism, and the stackers may be controlled by one controller.

What is claimed is:

1. A bill handling system in a gaming house containing a plurality of gaming machines for players to play games and a plurality of game play support machines for players to make payment required to play games with the gaming machines, each game play support machine having a mechanism for taking in bills for the payment, said bill handling system comprising:

- a cashbox having a mechanism for taking in and storing bills; and
- a collection system for gathering bills taken in the game play support machines and transporting the bills to said cashbox,
- said collection system comprising:
  - a plurality of stackers for stacking the bills taken in the support machines in order, and temporarily holding the bills; and
  - a bill transport mechanism for receiving the bills held in said stackers and transporting the bills to said cashbox, said bill transport mechanism having a transport passage connecting said stackers and said cashbox, a plurality of transport cassettes for holding bills with the bills stacked, and a mechanism for moving the transport cassettes along said transport passage, said transport passage comprising a passage circulating among said stackers and said cashbox for connection thereof, said transport cassette moving mechanism circulating the transport cassettes along said circulating passage,
  - said cashbox comprising:
    - a mechanism for receiving the bills transported with the transport cassettes from the cassettes and transferring the bills to said cashbox; and
    - a mechanism for holding the transferred bills;
    - each of said stackers comprising:
      - a stacker cassette for storing bills with the bills stacked;
      - intra-stacker cassette transport means for moving the stacker cassette between a storage position at which bills are loaded into the stacker cassette and a discharge position at which bills are discharged outside of said stacker;
      - an intra-stacker bill transport mechanism for taking in bills sent from the game play support machines and transporting the bills to the storage position;
      - a storage mechanism for storing bills transported by means of said intra-stacker bill transport mechanism in the stacker cassette with the bills stacked, at the storage position; and
      - a first transfer mechanism for transferring the bills stored in the stacker cassette to a transport cassette with the bills stacked, at the discharge position,
      - wherein a plurality of the gaming machines and a plurality of the game play support machines are placed side by side for making up a plurality of gaming machine islands situated in the gaming house, each of said gaming machine islands being provided with at least one stacker.

2. The bill handling system in the gaming house as claimed in claim 1 wherein said cashbox has:

- a cashbox cassette for storing bills with the bills stacked; and a second transfer mechanism for transferring bills from the transport cassette transported by said bill transport mechanism to the cashbox cassette with the bills stacked.

3. The bill handling system in the gaming house as claimed in claim 1 comprising at least two of said stacker cassettes.

4. The bill handling system in the gaming house as claimed in claim 1 wherein said stacker cassette and said transport cassette have entrances and exits corresponding to the bill size at at least one place, each of said entrances and exits having shutter members that can be opened and closed.

5. The bill handling system in the gaming house as claimed in claim 4 wherein said first transfer mechanism has a first piston member for pushing and opening the shutter members of the entrances and exits of the cassettes for transferring the stacked bills from the stacker cassette to the transport cassette.

6. The bill handling system in the gaming house as claimed in claim 2 wherein said cashbox cassette and said transport cassette have entrances and exits corresponding to the bill size in at least one direction, each of said entrances and exits having shutter members than can be opened and closed.

7. The bill handling system in the gaming house as claimed in claim 6 wherein said second transfer mechanism has a second piston member for pushing and opening the shutter members of the entrances and exits of the cassettes for transferring the stacked bills from the transport cassette to the cashbox cassette.

8. A stacker, for taking in bills sent from game play support machines and temporarily holding them, then discharging the bills outside of said stacker, installed in a gaming house containing a plurality of gaming machines, for players to play games, and a plurality of game play support machines, for players to make payment required to play games with the gaming machines, each game play support machine having a mechanism for taking in bills for the payment, said stacker comprising:

a cassette for storing bills with the bills stacked;

cassette transport means for moving the cassette between a storage position at which bills are loaded into the cassette and a discharge position at which bills are discharged to the outside of said stacker;

a bill transport mechanism for taking in bills from the game play support machines and transporting the bills to the storage position;

a storage mechanism for storing bills transported by means of said bill transport mechanism in the cassette with the bills stacked, at the storage position;

a transfer mechanism for discharging the bills stored in the cassette with the bills stacked, at the discharge position;

a sensor for sensing whether or not an external cassette into which the bills are to be discharged at the discharge position is empty; and a control system for causing said transfer mechanism to discharge bills at the discharge position when an output signal of said sensor indicates that the external cassette is empty.

9. A bill handling system, for taking in bills transported from game play support machines and discharging the bills outside of a gaming machine island, installed in the gaming machine island made up of a plurality of gaming machines for players to play games and a plurality of game play support machines for players to make payment required to play games with the gaming machines, each game play support machine having a mechanism for taking in bills for the payment, said bill handling system comprising:

an intra-island transport mechanism for transporting bills taken in the game play support machines one at a time; and a stacker for taking in bills transported by means of said intra-island transport mechanism and temporarily holding them, then discharging the bills outside, said stacker comprising:

a cassette for storing bills with the bills stacked;

cassette transport means for moving the cassette between a storage position at which bills are loaded into the cassette and a discharge position at which bills are discharged outside of said stacker;

an intra-stacker bill transport mechanism for taking in bills sent from the game play support machines and transporting the bills to the storage position;

a storage mechanism for storing bills transported by means of said intra-stacker bill transport mechanism in the cassette with the bills stacked, at the storage position;

a transfer mechanism for discharging the bills stored in the cassette with the bills stacked, at the discharge position;

a sensor for sensing whether or not an external cassette into which the bills are to be discharged is empty; and a control system for causing said transfer mechanism to discharge bills at the discharge position when an output signal of said sensor indicates that the external cassette is empty.

10. A gaming house containing a bill handling system for handling paid-out bills, comprising:

a plurality of gaming machines for players to play games;

a plurality of game play support machines for players to make payment required to play games with the gaming machines and each having a mechanism for taking in bills for the payment; and a double floor consisting of a first floor and a second floor formed on the first floor with a given space therebetween, said bill handling system comprising:

a cashbox having a mechanism for taking in and storing bills; and a collection system for gathering bills taken in the game play support machines and transporting the bills to said cashbox, said collection system comprising:

a plurality of stackers for stacking the bills taken in the support machines in order, and temporarily holding the bills; and a bill transport mechanism for receiving the bills held in said stackers and transporting the bills to said cashbox, said bill transport mechanism having a transport passage circulating among said stackers and said cashbox for connection thereof, said transport passage being installed in the space between said first and second floors, said bill transport mechanism having a plurality of transport cassettes for holding bills with the bills stacked and a mechanism for moving these transport cassettes along said transport passage, each of said stackers further includes a sensor for sensing whether or not the transport cassette positioned in said stacker is an empty cassette not loaded with bills, and when said sensor outputs a signal indicating that the cassette is empty the bills held in said stacker are transferred to the empty cassette, said cashbox comprising:

a mechanism for receiving the bills transported by means of said bill transport mechanism and transferring the bills to said cashbox; and a mechanism for holding the transferred bills.

11. The gaming house as claimed in claim 10 wherein said double floor is covered with blocks placed on said first floor for forming said second floor, each of said blocks having a structure for providing a given space on said first floor.

12. A bill handling system in a gaming house containing a plurality of gaming machines for players to play games and a plurality of game play support machines for players to make payment required to play games with the gaming machines, each game play support machine having a mechanism for taking in bills for the payment, said bill handling system comprising:

cashbox having a mechanism for taking in and storing bills; and a collection system for gathering bills taken in the game play support machines and transporting the bills to said cashbox, said collection system comprising:

a plurality of stackers for stacking the bills taken in by the support machines in order, and temporarily holding the bills;

a bill transport mechanism for receiving the bills held in said stackers and transporting the bills to said cashbox, said bill transport mechanism having a transport passage connecting said stackers and said cashbox, said bill transport mechanism having a plurality of transport cassettes for holding bills with the bills stacked and a mechanism for moving the transport cassettes along said transport passage;

a control system which controls operation of said stackers and said bill transport mechanism, said control system having a first controller for controlling at least said bill transport mechanism, second controllers being provided for each of said stackers for controlling operation of said stackers, and communication means for transferring information between said first and second controllers, wherein when bills held in one of said stackers reach a given quantity, said control system causes said stacker to transfer the held bills to said bill transport mechanism for transporting the transferred bills to said cashbox, and when the bills arrive at a position of said cashbox, causes said bill transport mechanism to transfer the bills to said cashbox;

each of said stackers including a sensor for sensing whether or not the transport cassette positioned in said stacker is an empty cassette not loaded with bills, whereby when said sensor outputs a signal indicating that the cassette is empty, said second controller corresponding to said stacker controls so as to transfer the bills held in said stacker to the empty cassette.

* * * * *